(12) United States Patent
Normen

(10) Patent No.: US 6,577,977 B2
(45) Date of Patent: Jun. 10, 2003

(54) PROCESS PARAMETER SENSOR APPARATUS, METHODS AND COMPUTER PROGRAM PRODUCTS USING FORCE FILTERING

(75) Inventor: David F. Normen, Louisville, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 09/250,203

(22) Filed: Feb. 16, 1999

(65) Prior Publication Data

US 2003/0083829 A1 May 1, 2003

(51) Int. Cl.$^7$ .................... G01N 21/00; G01N 11/00
(52) U.S. Cl. .................... 702/100; 702/56; 702/190; 73/861.356
(58) Field of Search .................... 702/45, 46, 48, 702/50, 54, 55, 56, 100, 114, 124, 127, 182, 184, 188, 189, 190, 193, 196, 197, 33, 36, 39; 73/861.38, 861.356

(56) References Cited

U.S. PATENT DOCUMENTS

| 4,777,833 A | 10/1988 | Carpenter | 73/861.38 |
| 4,934,194 A | 6/1990 | Itoh et al. | |
| 5,009,109 A | 4/1991 | Kalotay et al. | 73/861.38 |
| 5,301,557 A | 4/1994 | Cage et al. | 73/861.38 |
| 5,648,616 A | 7/1997 | Keel | |
| 5,734,112 A | 3/1998 | Bose et al. | 73/861.56 |
| 5,792,199 A * | 8/1998 | Fayram et al. | 607/19 |
| 6,249,752 B1 * | 6/2001 | Cunningham et al. | 702/100 |
| 6,272,438 B1 * | 8/2001 | Cunningham et al. | 702/56 |

FOREIGN PATENT DOCUMENTS

| EP | 0 578 113 A2 | 1/1984 | G01F/1/84 |
| EP | 0 701 107 A2 | 3/1996 | G01F/1/00 |
| EP | 0 702 212 A2 | 3/1996 | |
| WO | WO 92/14123 | 8/1992 | G01F/1/84 |
| WO | WO 95/16897 | 6/1995 | G01F/1/84 |
| WO | WO 95/29385 | 11/1995 | G01F/1/84 |
| WO | WO 97/40348 | 10/1997 | G01F/1/84 |
| WO | WO 98/07009 | 2/1998 | G01F/1/84 |
| WO | WO 99/02945 | 1/1999 | |
| WO | WO 00/04345 | 1/2000 | |

OTHER PUBLICATIONS

Cunningham; "Zero Shifts Due to Non-Proportional Damping", Micro Motion Report #10233, Part of IMAC XV, Feb. 1997, Session 8j, Structural Damping.

(List continued on next page.)

Primary Examiner—Marc S. Hoff
Assistant Examiner—Paul Kim
(74) Attorney, Agent, or Firm—Faegre & Benson LLP

(57) ABSTRACT

A process parameter associated with a material contained in a vibrating structure is estimated. A plurality of motion signals representing motion at a plurality of locations of the vibrating structure are received. The received plurality of motion signals are force filtered with a force filter to produce a force-filtered motion signal that discriminates motion attributable to a force of interest among a plurality of forces acting on the vibrating structure. A process parameter associated with the material contained in the vibrating structure is estimated from the force filtered motion signal. Preferably, a plurality of motion signal values is generated from the received plurality of motion signals, and force filtering includes the step of applying a force filter matrix to the plurality of motion signal values to produce a force filtered motion signal value. A process parameter, such as mass flow, density or the like, is then estimated from the force filtered motion signal value. According to an aspect of the present invention, the force filter matrix represents a product of a frequency response function matrix for the vibrating structure, a force selectivity matrix and an inverse of the frequency response function matrix. Methods for estimating structural motion, along with related apparatus and computer program products, are also discussed.

42 Claims, 22 Drawing Sheets

OTHER PUBLICATIONS

Bosse et al.; "Application of Modal Filtering Techniques to Vibration Control of Precision Truss", AD–vol. 45/MD–vol. 54, Adaptive Structures and Composite Material, Analysis and Application ASME 1994, pp. 281–285.

Cunningham; "Zero Shifts in Coriolis Sensors Due to Imbalance", Proceedings of AIAA/ASME/ASCE/AHS/ASC $35^{th}$ Structures, Structural Dynamics and Materials Conference, Apr. 18–20, 1994, AIAA Paper 94–1621 (A94–2411a).

Stack, Garnett, Pawlas; "A Finite Element for the Vibration Anaylsis of Fluid–Conveying Timoshenko Beam", AIAA Paper 93–1552, pp. 1–10 (1993).

Allemang, Dr. Randall J., "Vibrations: Analytical and Experimental Modal Analysis", University of Cincinnati, Department of Mechanical, Industrial and Nuclear Engineering,1900–1994, Chapters 1–8, Appendix A, B.

Timothy J. Cunningham, Modal Analysis and Zero Stability of Coriolis Mass Flowmeters (1993) (M. of Science Thesis, Colorado State University (Fort Collins)).

Rieder, Drahm; "A New Type of Single Straight Tube Coriolis Mass Flowmeter", Flomenko '96, presented at the $8^{th}$ International Conference (1996), p. 250–255.

Stuart J. Shelley, Investigation of Discrete Modal Filters For Structural Dynamic Applications (1991) (Unpublished Ph. D. Dissertation, University of Cincinnati).

* cited by examiner

US 6,577,977 B2

PROCESS PARAMETER SENSOR APPARATUS, METHODS AND COMPUTER PROGRAM PRODUCTS USING FORCE FILTERING

FIELD OF THE INVENTION

The present invention relates to analysis of sensors and similar structures, and more particularly to process parameter sensors such as mass flowmeters, and related methods and computer program products.

BACKGROUND OF THE INVENTION

Many sensor applications involve the detection of mechanical vibration or other motion. Examples of sensors that utilize such motion detection include Coriolis mass flowmeters and vibrating tube densitometers. These devices typically include a conduit or other vessel that is periodically driven, i.e., vibrated. Properties such as mass flow, density and the like associated with a material contained in the conduit or vessel may be determined by processing signals from motion transducers positioned on the containment structure, as the vibrational modes of the vibrating immaterial-filled system generally are affected by the combined mass and stiffness characteristics of the containing conduit or vessel structure and the material contained therein.

A typical Coriolis mass flowmeters includes one or more conduits that are connected inline in a pipeline or other transport system and convey material, e.g., fluids, slurries and the like, in the system. Each conduit may be viewed as having a set of natural vibrational modes including, for example, simple bending, torsional, radial and coupled modes. In a typical Coriolis mass flow measurement application, each conduit is excited at resonance in one of its natural vibrational modes as a material flows through the conduit. Excitation is typically provided by an actuator, e.g., an electromechanical device such as a voice coil-type driver, that perturbs the conduit in a periodic fashion. Exemplary Coriolis mass flowmeters are described in U.S. Pat. Nos. 4,109,524 to Smith, 4,491,025 to Smith et al., and Re. 31,450 to Smith.

A commonly used type of Coriolis mass flowmeter includes parallel U-shaped conduits that form parallel material paths. The conduits are driven by a voice coil actuator connected between the conduits near their apices. A periodic drive signal applied to the actuator causes the conduits to be excited in opposing periodic patterns.

When there is substantially zero flow through a conduit, points along the conduit tend to oscillate with approximately the same phase. When material is flowing through the conduit, however, Coriolis forces arising from the material flow tend to induce phase shifts between spatially diverse points along the length of the conduit, with the phase of the inlet end of the conduit generally lagging the driver and the phase of the outlet end of the conduit generally leading the driver. The phase shift induced between two locations on the conduit is approximately proportional to the mass flow rate of the material flowing through the conduit. This phase shift typically is measured by measuring a phase shift between motion signals produced by first and second motion transducers placed near the inlet and outlet ends of the conduit, respectively, at the excitation frequency of the mass flowmeter.

Unfortunately, the accuracy of such a phase shift measurement may be compromised by nonlinearities and asymmetries in the conduit structure, as well as by unwanted contributions to the phase shift caused by extraneous forces such as forces generated by pumps and compressors that are attached to the flowmeter, as well as pressure forces exerted by the material flowing through the flowmeter. The effects of these forces are commonly compensated for by using flowmeter designs that are balanced to reduce effects attributable to external vibration, and by using frequency domain filters, e.g., bandpass filters designed to filter out components of the motion signals away from the excitation frequency. However, mechanical filtering approaches are often limited by mechanical considerations, e.g., material limitations, mounting constraints, weight limitations, size limitations and the like, and frequency domain filtering may be ineffective at removing unwanted vibrational contributions near the excitation frequency.

SUMMARY OF THE INVENTION

In light of the foregoing, it is an object of the present invention to provide process parameter sensors and associated methods and computer program products that can more accurately measure process parameters associated with material contained in a vibrating conduit or vessel.

It is another object of the present invention to provide apparatus, methods and computer program products that can provide more accurate characterization of structural motion.

These and other objects, features and advantages are provided according to the present invention by apparatus, methods and computer program products that utilize a force filter configured to receive motion signals representing motion of a conduit, vessel or other mechanical structure, and operative to produce a force-filtered motion signal that discriminates motion attributable to a force of interest among a plurality of forces acting on the structure. In process parameter sensing embodiments, the force-filtered motion signal may be used to estimate a process parameter, such as mass flow or density, associated with a material contained in a conduit or other vessel. In other embodiments, additional mode pass and/or band pass filtering is applied to produce a spatially and/or temporally filtered motion signal that may also be used, for example, for process parameter estimation.

The present invention arises from the realization that a force filter operative to filter motion attributable to selected forces acting on a structure may be generated from a modal analysis of the structure, thus carrying the applicability of modal analysis beyond the mere identification of modal responses. In addition, such a force filter may be combined with modal and temporal filtering techniques to provide improved accuracy in motion detection.

According to an embodiment of the present invention, a process parameter associated with a material contained in a vibrating structure is estimated. A plurality of motion signals representing motion at a plurality of locations of the vibrating structure is received. The received plurality of motion signals are force filtered with a force filter to produce a force-filtered motion signal that discriminates motion attributable to a force of interest among a plurality of forces acting on the vibrating structure. A process parameter associated with the material in the vibrating structure is estimated from the force filtered motion signal. Preferably, a plurality of motion signal values is generated from the received plurality of motion signals, and force filtering comprises the step of applying a force filter matrix to the plurality of motion signal values to produce a force filtered motion signal value. A process parameter, such as mass flow, density or the like, is then estimated from the force filtered motion signal value. According to an aspect of the present invention, the force filter matrix represents a product of a frequency response function matrix for the vibrating structure, a force selectivity matrix and an inverse of the frequency response function matrix.

According to one embodiment of the present invention, the force filter may represent a function of frequency evaluated at a frequency of interest, e.g., a drive mode resonant frequency. A process parameter is estimated from the force filtered motion signal at the frequency of interest. The received motion signal may represent motion in response to an excitation of the structure at the frequency of interest.

According to other embodiments, force filtering may be combined with temporal (frequency) and modal filtering. For example, a band pass filter, e.g., a filter having a passband around a frequency of interest such as a drive mode resonant frequency, may be applied to the force filtered motion signal to produce a temporally filtered motion signal. A process parameter may then be estimated from the temporally filtered motion signal at the frequency of interest. In another embodiment, a combination of the force filter and a modal resolver, e.g., a "mode pass" filter, is applied to the plurality of motion signals to produce a spatially and temporally filtered motion signal that discriminates motion of the structure associated with a vibrational mode of interest, and a process parameter is estimated from the spatially and temporally filtered motion signal. Force, temporal and modal filtering may also be applied in combination.

According to yet another aspect of the present invention, motion attributable to a force of interest among a plurality of forces applied to a structure is estimated. A motion signal representing motion of the structure is force filtered to produce a force filtered motion signal that discriminates motion attributable to the force of interest. Preferably, the force filtering comprises applying a force filter matrix to a motion signal value generated from the motion signal to produce a force filtered motion signal value. The force filter matrix may represent a product of a frequency response function matrix for the structure, a force selectivity matrix and an inverse of the frequency response function matrix.

According to another aspect of the present invention, a process parameter sensor comprises a structure configured to contain a material, and a plurality of motion transducers operatively associated with the structure and operative to produce a plurality of motion signals representing motion of the structure. A force filter is responsive to the plurality of motion signals and operative to produce a force-filtered motion signal therefrom that discriminates motion attributable to a force of interest among a plurality of forces acting on the structure. A process parameter estimator is operative to estimate a process parameter associated with material in the structure responsive to the force filtered motion signal. Preferably, the sensor includes means for generating a plurality of motion signal values from the plurality of motion signals, the force filter comprises means for applying a force filter matrix to the plurality of motion signal values to produce a force filtered motion signal value, and the process parameter estimator comprises means for estimating a process parameter from the force filtered motion signal value. The force filter matrix may represent a product of a frequency response function matrix for the structure, a force selectivity-matrix and an inverse of the frequency response function matrix.

According to yet another aspect of the present invention, a computer program product for determining motion attributable to a force of interest among a plurality of forces applied to a structure is provided. The computer program product comprises a computer-readable storage medium having computer-readable program code means embodied in the medium, the computer-readable program code means including computer-readable program code means for force filtering a motion signal representing motion of the structure to produce a force filtered motion signal that discriminates motion attributable to the force of interest. The computer-readable program code means preferably comprises computer-readable program code means for applying a force filter matrix to a motion signal value to produce a force filtered motion signal value, wherein the force filter matrix may represent a product of a frequency response function matrix for the structure, a force selectivity matrix and an inverse of the frequency response function matrix.

Improved methods, apparatus, and computer program products for estimating motion in a structure, such as a Coriolis mass flowmeter conduit, are thereby provided.

DETAILED DESCRIPTION OF EMBODIMENTS

Figure 1:
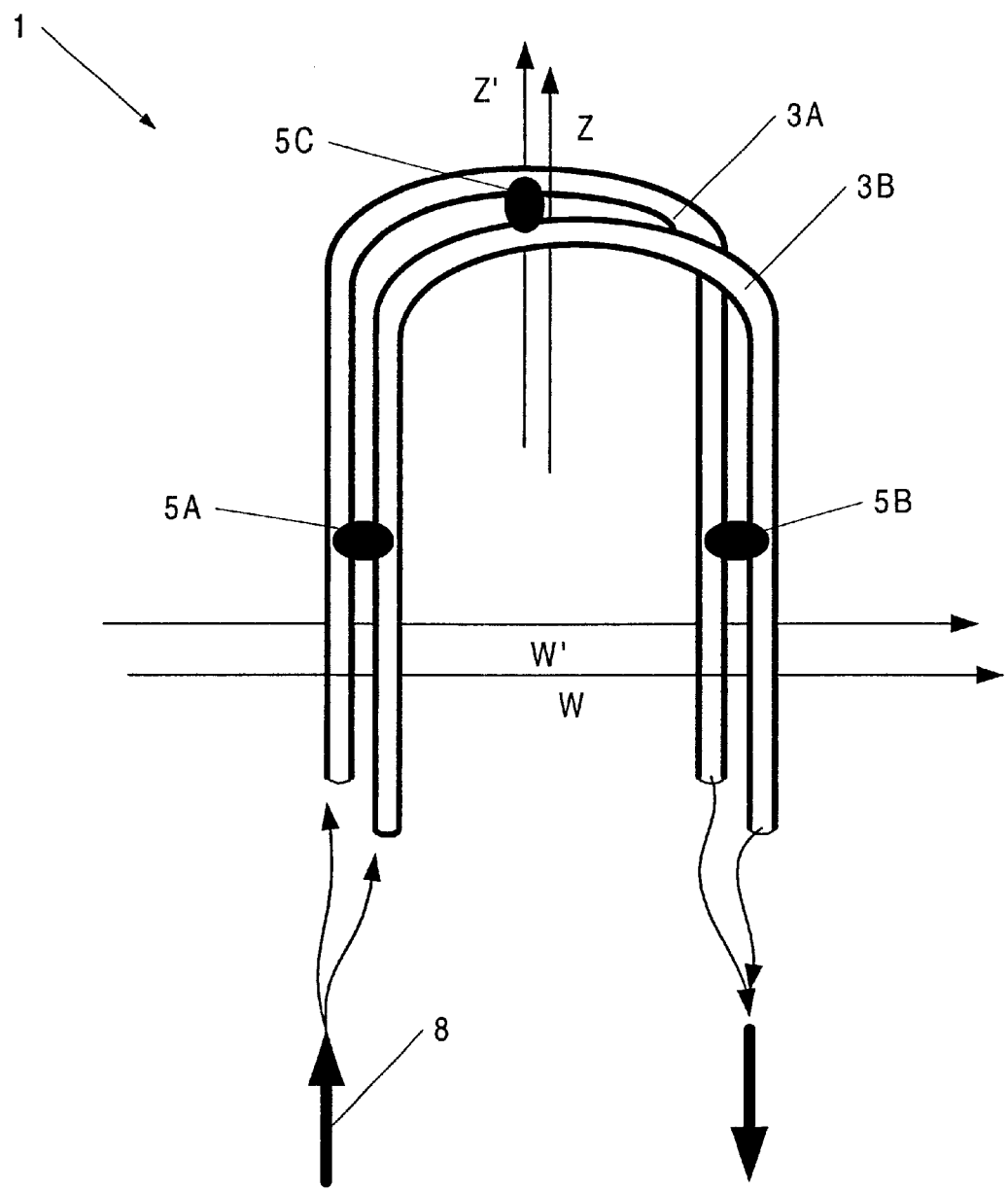
FIG. 1 conceptually illustrates a conventional Coriolis mass flowmeter structure.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as systems (apparatus), methods, or computer program products.

The embodiments of the present invention described herein relate to Coriolis mass flowmeters. Those skilled in the art will appreciate, however, that the force filtering and related concepts described herein are generally applicable to determination of motion in a wide variety of mechanical structures, and thus the apparatus and methods of the present invention are not limited to Coriolis mass flowmetering.

Modal Behavior of a Vibrating Conduit

Behavior of a vibrating structure such as a Coriolis mass flowmeter conduit may be described in terms of one or more natural modes having associated natural frequencies of vibration. The modes and the associated natural frequencies may be mathematically described by eigenvectors and associated eigenvalues, the eigenvectors being unique in relative magnitude but not absolute magnitude and orthogonal with respect to the mass and stiffness of the structure. The linearly independent set of vectors may be used as a transformation to uncouple equations that describe the structure's motion. In particular, the response of the structure to an excitation can be represented as a superposition of scaled modes, the scaling representing the contribution of each mode to the motion of the structure. Depending on the excitation, some modes may contribute more than others. Some modes may be undesirable because they may contribute energy at the resonant frequency of desired modes and therefore may corrupt measurements taken at the resonant frequency of a desired mode, such as phase difference measurements taken at the drive frequency.

Conventional Coriolis mass flowmeters typically use structural and temporal filtering to reduce the effects of undesirable modes. Conventional structural filtering techniques include using mechanical features such as brace bars designed to decouple in phase and out of phase bending modes, actuators positioned such that they are less likely to excite undesirable modes and transducers placed such that they are less sensitive to undesirable modes. Structural filtering techniques can be very effective in reducing energy of undesired modes, but may be limited by geometric and fabrication constraints.

Temporal filtering techniques typically modify transducer signals based on time domain or frequency domain parameters. For example, a typical Coriolis mass flowmeter may include frequency domain filters designed to remove frequency components that are significantly correlated with undesired modes. However, off-resonance energy from undesired modes may contribute considerably to energy at the resonant frequency of a desired mode. Because frequency-domain filters generally are ineffective at distinguishing the contribution of multiple modes at a given frequency, the contribution of undesired modes at a measurement frequency may be a significant source of error in process parameter measurements.

A sensor conduit structure with negligible damping and zero flow may be assumed to have purely real natural or normal modes of vibration, i.e., in each mode, each point of the structure reaches maximum displacement simultaneously. However, a real conduit having non-negligible damping and a material flowing therethrough has a generally complex response to excitation, i.e., points of the structure generally do not simultaneously reach maximum amplitude.

The motion of the conduit structure may be described as a complex mode having real and imaginary components or, alternatively, magnitude and phase components. Coriolis forces imparted by the flowing material render motion of the sensor conduit of the sensor conduit mathematically complex.

Even if complex, motion of a conduit structure can be described as a superposition of scaled natural or "normal" modes, as the real and imaginary parts of a complex mode are linearly independent by definition. To represent complex motion, complex scaling coefficients are used in combining the constituent real normal modes. Particular real normal modes may be closely correlated with the imaginary component of the complex mode while being significantly less correlated with the real component of the complex mode. Accordingly, these particular real normal modes may be more closely correlated with the Coriolis forces associated with the material in the sensor conduit, and thus can provide information for generating an accurate estimate of a parameter associated with the material.

A conceptual model of a Coriolis mass flowmeter conduit structure 1 is provided in FIG. 1. Motion transducers 5A, 5B, 5C (e.g., velocity transducers) are positioned to detect relative motion of first and second conduits 3A, 3B of the conduit structure 1 as a material 8 flows through the conduits 3A, 3B. A response vector $\{x\}$ can be constructed from the outputs of the motion transducers 5A–C, for example, by sampling motion signals produced by each of the transducers to generate motion signal values $x_1$, $x_2$, $X_3$ for the response vector $\{x\}$. A real normal modal matrix $[\Phi]$, that is, an eigenvector matrix relating the physical motion vector to a modal motion vector $\{\eta\}$ representing motion in a plurality of single degree of freedom (SDOF) modes, may be identified such that:

$$\{x\}=[\Phi]\{\eta\}. \qquad (1)$$

The modal matrix $[\Phi]$ can be identified using a number of techniques. For example, trial and error or inverse techniques may be used as described in U.S. patent application Ser. No. 08/890,785, filed Jul. 11, 1997, assigned to the assignee of the present application and incorporated by reference herein in its entirety.

Derivation of a Spatial Force Filter

A dynamic system may be described by a differential equation of motion:

$$[M]\{\ddot{x}\}+[C]\{\dot{x}\}+[K]\{x\}=\{F\}, \qquad (2)$$

where x represents displacement in response to forces $\{F\}$ applied to the system. A solution of equation (2), assuming harmonic forces and a linear time invariant system, takes the form:

$$\{\dot{x}\} = \frac{j\omega}{-\omega^2[M] + j\omega[C] + K}\{F\}. \qquad (3)$$

Solving equation (3) for eigenvalues $[\lambda]$ and eigenvectors, $[\Phi]$ of the system:

$$\{\dot{x}\}=[[\Phi][Q][\beta(\omega)][\Phi]^T+[\Phi][Q]^*[\beta^*(\omega)][\Phi]^T]\{F\}, \qquad (4)$$

where $[\delta(\omega)]$ represents poles associated with r vibrational modes of the system $$[\delta(\omega)] = \left[\frac{1}{j\omega - \lambda_r}\right],$$

[Q] represents a mode scaling matrix $$[Q] = \left[\frac{-j}{2m_r\omega_r}\right],$$

and * denotes a complex conjugate.

A frequency response function matrix [H(ω)], in terms of the displacement response of the system, may be given by:

$$[H(\omega)] = [\Phi][Q][\beta(\omega)][\Phi]^T + [\Phi][\bar{Q}][\bar{\beta}(\omega)][\Phi], \quad (5)$$

If the eigenvector matrix [Φ] is mass normalized, the mass matrix [M] is transformed into the identity matrix [I], and the modal scaling matrix [Q] becomes:

$$[Q] = \left[\frac{-j}{2\omega_r}\right].$$

The eigenvalues [λ] are complex numbers containing the damping and damped natural frequencies of the system.

Equation (5) may be reduced to:

$$[H(\omega)] = [\Phi][W_r][\Delta(\omega)][\Phi]^T, \quad (6)$$

where $$[W_r] = \left[\frac{1}{2\omega_r}\right], \quad \text{and} \quad [\Delta(\omega)] = \left[\frac{\omega}{j\omega - \lambda_r} + \frac{-\omega}{j\omega - \lambda_r^*}\right].$$

It will be noted that [δ(ω)], [$W_r$], [Δ(ω)], and [Q] are all diagonal matrices.

The physical response $\{\dot{x}\}$ of the system may be calculated by a compact form of a combination of equations (4) and (5):

$$\{\dot{x}\} = [H(\omega)]\{F\}. \quad (6)$$

The inverse of the frequency response function matrix $[H(\omega)]^{-1}$ may be viewed as the impedance of the system. In other words, given a plurality of physical responses $\{\dot{x}\}$, forces {F} acting on the system may be determined by multiplying the physical responses of by the impedance of the system:

$$\{F\} = [H(\omega)]^{-1}\{\dot{x}\}. \quad (7)$$

To determine a force-filtered physical response $\{\dot{x}\}_{FF}$, both sides of equation (7) may be pre-multiplied by a scaling matrix [A].

$$[A]\{F\} = [A][H(\omega)]^{-1}\{\dot{x}\}. \quad (8)$$

For example, the scaling matrix [A] may represent a "selectivity matrix" that attenuates components in the response $\{\dot{x}\}$ that are attributable to undesirable extraneous forces, e.g., a diagonal matrix with zeroes ("0") at positions on its diagonal that correspond to the extraneous forces, and ones ("1") elsewhere. It will be understood, however, that the scaling matrix [A] could implement any of a number of other filtering operations on the response $\{\dot{x}\}$, including amplification and phase inversion.

Both sides of equation (8) may then be pre-multiplied by the frequency response function matrix [H(ω)]:

$$\{\dot{x}_{FF}\} = [H(\omega)][A]\{F\}\{\dot{x}\} = [H(\omega)][A][H(\omega)]^{-1}\{\dot{x}\}, \quad (9)$$

from which a force filter [FF(ω)] may be defined as:

$$[FF(\omega)] = [H(\omega)][A][H(\omega)]^{-1}. \quad (10)$$

Combining equations (5) and (10):

$$[FF(\omega)] = [\Phi][W_r][\Delta(\omega)][\Phi]^T[A]([\Phi][W_r][\Delta(\omega)][\Phi]^T)^{-1}, \quad (11)$$

or $$[FF(\omega)] = [\Phi][W_r][\Delta(\omega)][\Phi]^T[A]([\Phi]^T)^{-1}[\Delta(\omega)]^{-1}[W_r]^{-1}[\Phi]^{-1}, \quad (12)$$

The force filter [FF(ω)] may thus be determined from the eigenvector (modal) matrix [Φ] and information about the poles of the system, all of which is determinable using finite element modeling, experimental modal analysis, or similar techniques. Such techniques are generally described in a text entitled *Vibrations: Analytical and Experimental Modal Analysis*, by Allemang, published by the University of Cincinnati (UC-SDRL-CN-20-263-662) (March 1994). Such techniques are also described in U.S. patent application Ser. No. 09/116,410, filed Jul. 16, 1998, assigned to the assignee of the present invention and incorporated by reference herein in its entirety. Techniques for in situ identification of modal parameter are also described in U.S. patent application Ser. No. 09/350,844, filed Jul. 9, 1999 assigned to the assignee of the present invention, and incorporated by reference herein in its entirety.

As described above, a force filter may be applied to a physical response, such as a velocity vector $\{\dot{x}\}$, to derive a force filtered response. The force-filtered response preferably represents motion of a structure minus components of the physical response that are attributable to extraneous forces. It will be appreciated by those skilled in the art that the force-filtered motion may be used for a number of different purposes, including a number of control and measurement applications. In the metering applications described herein, for example, force filtered motion signals may be generated from motion signals representing motion of a conduit or vessel containing a material, e.g., signals representing displacement, velocity or acceleration at positions on the conduit or vessel. Conventional phase or time difference measurements may be applied to the force filtered motion signal to generate estimates of mass flow, density, and other process parameters associated with the contained material.

Figure 2A:
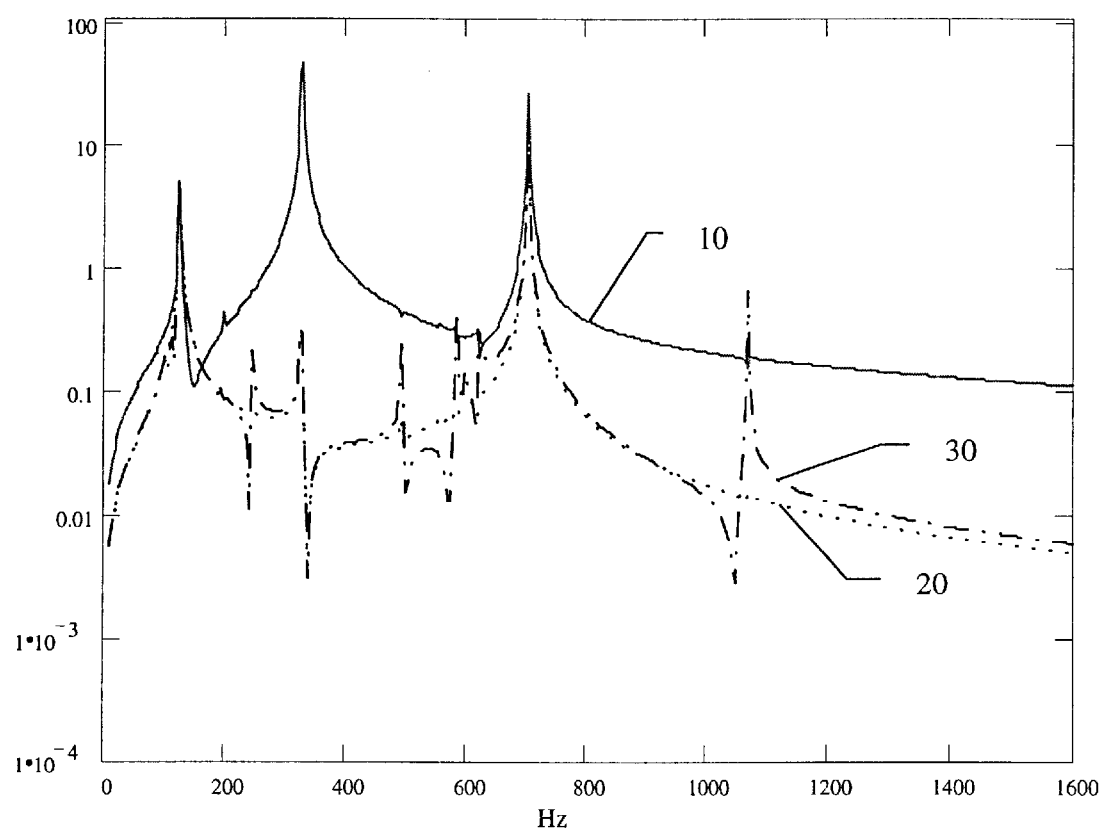
FIGS. 2A–2B, 3A–3B, 4A–4B, and 5 illustrate exemplary frequency responses for a prototype Coriolis mass flowmeter according to embodiments of the present invention.

FIGS. 2A–5 illustrate effects of a force filter applied to motion signals produced from a transducer of an exemplary Coriolis mass flow meter, in particular, responses for a transducer (or pick off) location of a prototype three-inch Coriolis mass flowmeter, subject to excitation from both a driver and a plurality of other, extraneous forces. FIGS. 2A–2B illustrate an unfiltered physical response 10 and an ideal response 20 representing conduit motion if only the normal drive force (a force bending the conduits 3A, 3B of FIG. 1 about axes W, W') were acting upon the conduit structure without extraneous excitation. A force-filtered response 30 represents the result of application of a force filter as described above to the unfiltered response 10. The unfiltered response 10 exhibits a peak at the resonant frequency (~325 Hz) of a first twist mode of the conduit structure (corresponding to motion about axes Z, Z' in FIG. 1), indicating excitation of the twist mode by the extraneous forces. The ideal response 20 illustrates a response at the twist mode frequency that is normally approximately two orders of magnitude lower. The force-filtered response 30 illustrates that the force filter can reduce excitation due to extraneous forces.

Figure 2B:
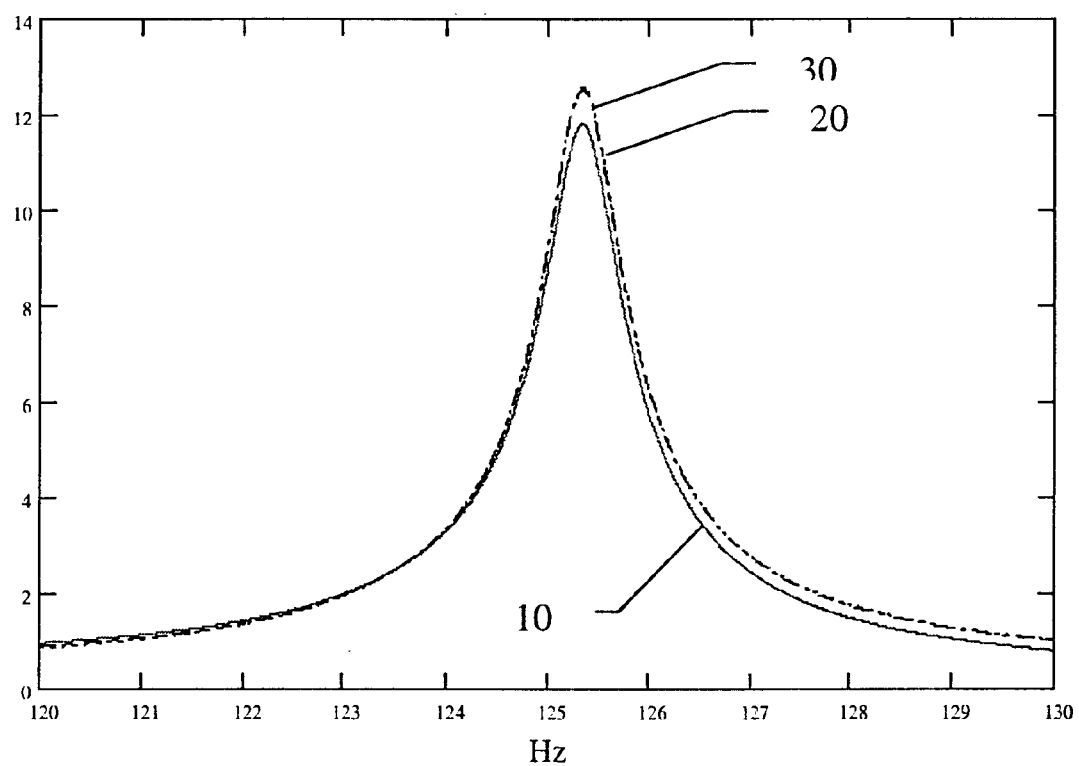

The force-filtered response 30 of FIGS. 2A–2B was determined by using a force filter (a function of frequency as described above) evaluated at each of a range of frequencies. In a practical Coriolis mass flowmeter or other sensor application, however, it may be preferable to evaluate the force filter at a limited number of frequencies. For example, in Coriolis mass flowmetering applications in which conventional phase or time difference type measurements are employed at the drive mode frequency, it may be desirable to calculate the force filter at only the drive mode frequency.

Figure 3A:
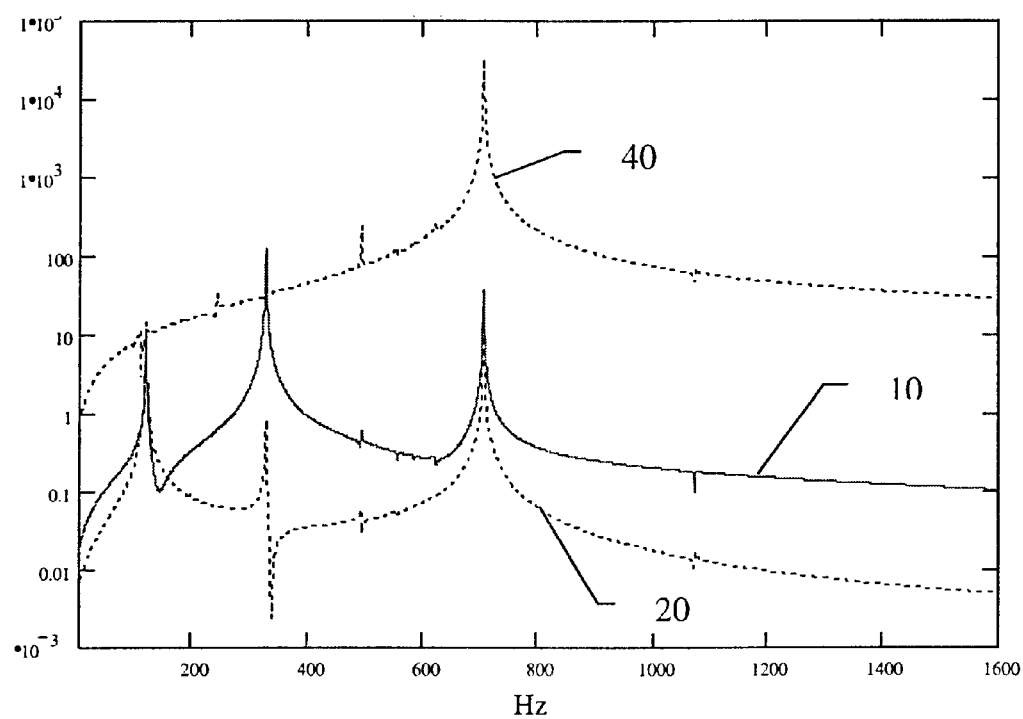
Figure 3B:
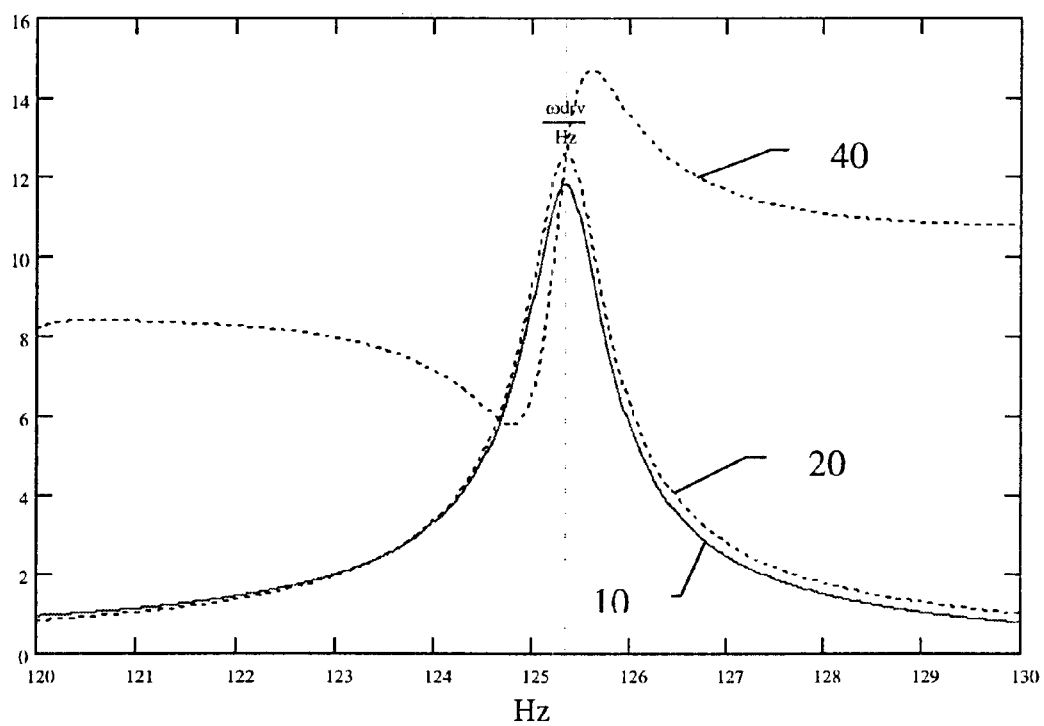
Figure 4A:
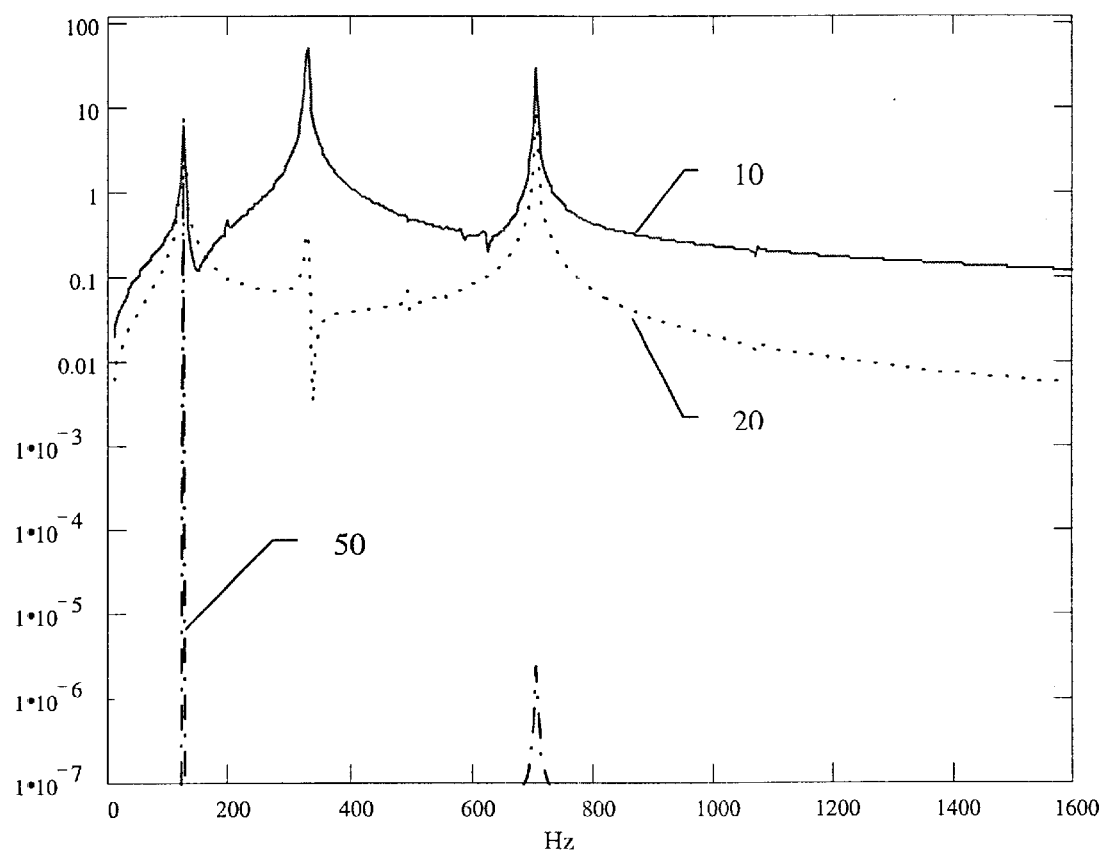
Figure 4B:
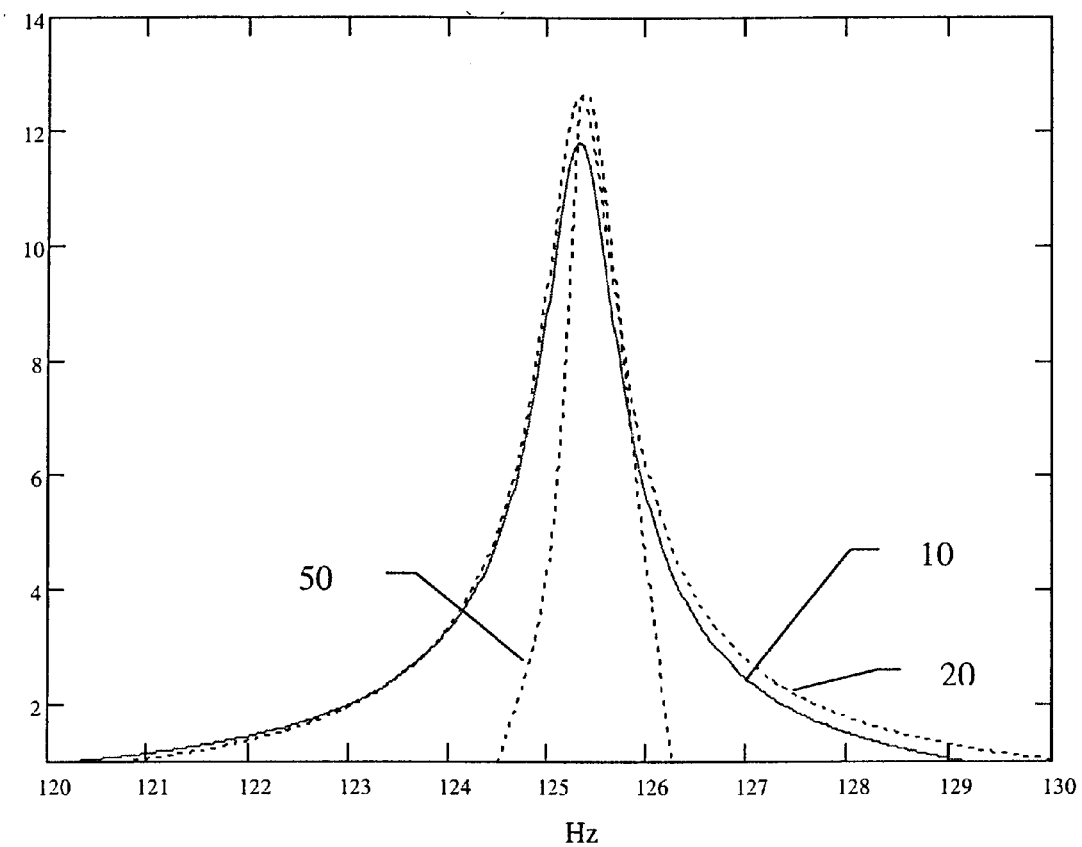
Figure 5:
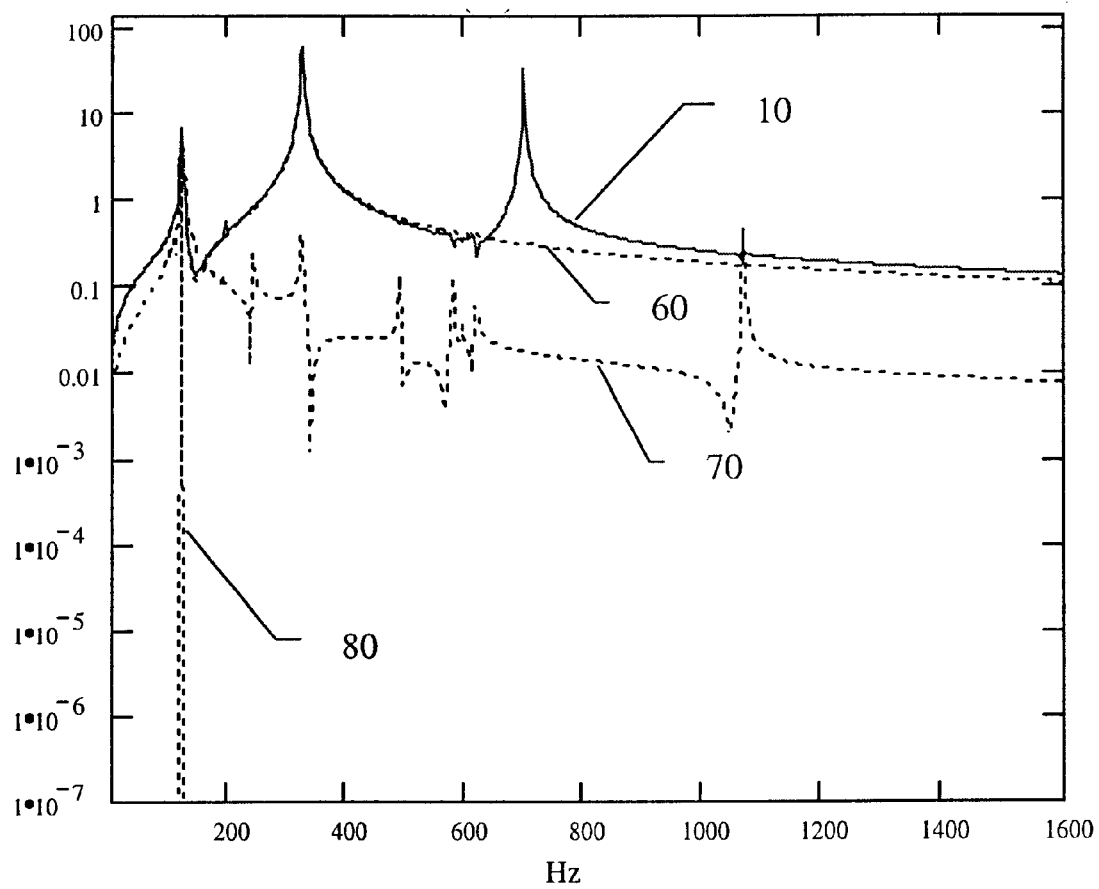

As shown in FIGS. 3A–3B, applying a force filter evaluated only at the drive mode frequency results in a modified force filtered response 40 that exhibits an amplified response away from the drive mode resonant frequency. This amplification away from the drive mode resonant frequency can be compensated by applying a temporal (frequency domain) bandpass filter. The band pass filter may be, for example, an analog two-pole filter or a digital filter such as a finite impulse response (FIR) filter. Such a temporal filter attenuates components of the force-filtered response at frequencies other than those near the drive frequency. A simple analog, two pole band pass filter may be mathematically represented by:

$$bandpass(\omega) = \frac{j\xi\left(\frac{\omega}{\omega_c}\right)}{1 + j\omega\left(\frac{\omega}{\omega_c}\right) - \left(\frac{\omega}{\omega_c}\right)^2},$$

where the center frequency, $\omega_c$ is the drive frequency. FIGS. 4A–4B illustrate a temporally filtered response 50 resulting from combining a single frequency force filter with a bandpass filter.

Increased accuracy in discriminating motion attributable to a force of interest may also be achieved using modal filtering to filter out components of the force filtered response that are associated with motion in undesired vibrational modes. Such modal filtering techniques are described in detail in the aforementioned U.S. patent application Ser. No. 09/116,410, filed Jul. 16, 1998. A spatial "mode pass" filter of the type described therein applied to the motion signals from a motion transducer on the simulated structure described above yields the mode pass filtered response 60 illustrated in FIG. 5. The response 60 exhibits a reduced response at the second bend mode frequency (~700 Hz). When this mode pass filtering is combined with a force pass filter as described above, a spatially filtered response 70 is produced. If a temporal band pass filter having a pass band centered on the drive mode frequency is also applied, a spatially and temporally filtered response 80 is produced. The spatially and temporally filtered signal 80 can be used, for example, for conventional phase-difference type Coriolis mass flow measurement.

The force filtering and ancillary bandpass and modal filtering described above may be applied to other types of conduits, vessels or other material-containing structures than the dual-tube configuration illustrated in FIG. 1. As described in detail below, for example, force filtering may be applied to characterize motion of a straight-tube flowmeter conduit. Those skilled in the art will also appreciate that the present invention is also generally applicable to characterization of motion of any number of types of structures other than flowmeters and similar parameter sensors.

Exemplary Mass Flowmeters

Specific embodiments according to the present invention will now be described, in particular, exemplary embodiments of so-called "straight tube" Coriolis mass flowmeters. Those skilled in the art will appreciate, however, that the present invention is also applicable to curved-conduit structures such as the structure 1 conceptually illustrated in FIG. 1, as well as to other material-containing structures such as may be used in mass flowmeters, densitometers and the like. Those skilled in the art will further appreciate that the present invention is also applicable to the characterization of motion in a wide variety of other structures.

The following discussion relates to the use of "force filtering" to process components of motion signals representing motion of a structure such as a mass flowmeter conduit. The force filters described herein are operative to discriminate motion attributable to one or more forces of a plurality of forces acting on the structure. Those skilled in the art will appreciate that "discrimination" of a motion signal component, as described herein, may be viewed as identification of a component associated with a given force of interest, as well as attenuation of one or more components associated with extraneous forces other than the force of interest. For example, motion components associated with Coriolis force arising from flow of a material through a conduit of a mass flowmeter may be discriminated by attenuating components associated with extraneous, "undesirable" forces arising from such things as pressure pulses in the material and vibrations of equipment connected to the flowmeter such as pumps and compressors, and the like.

Figure 6:
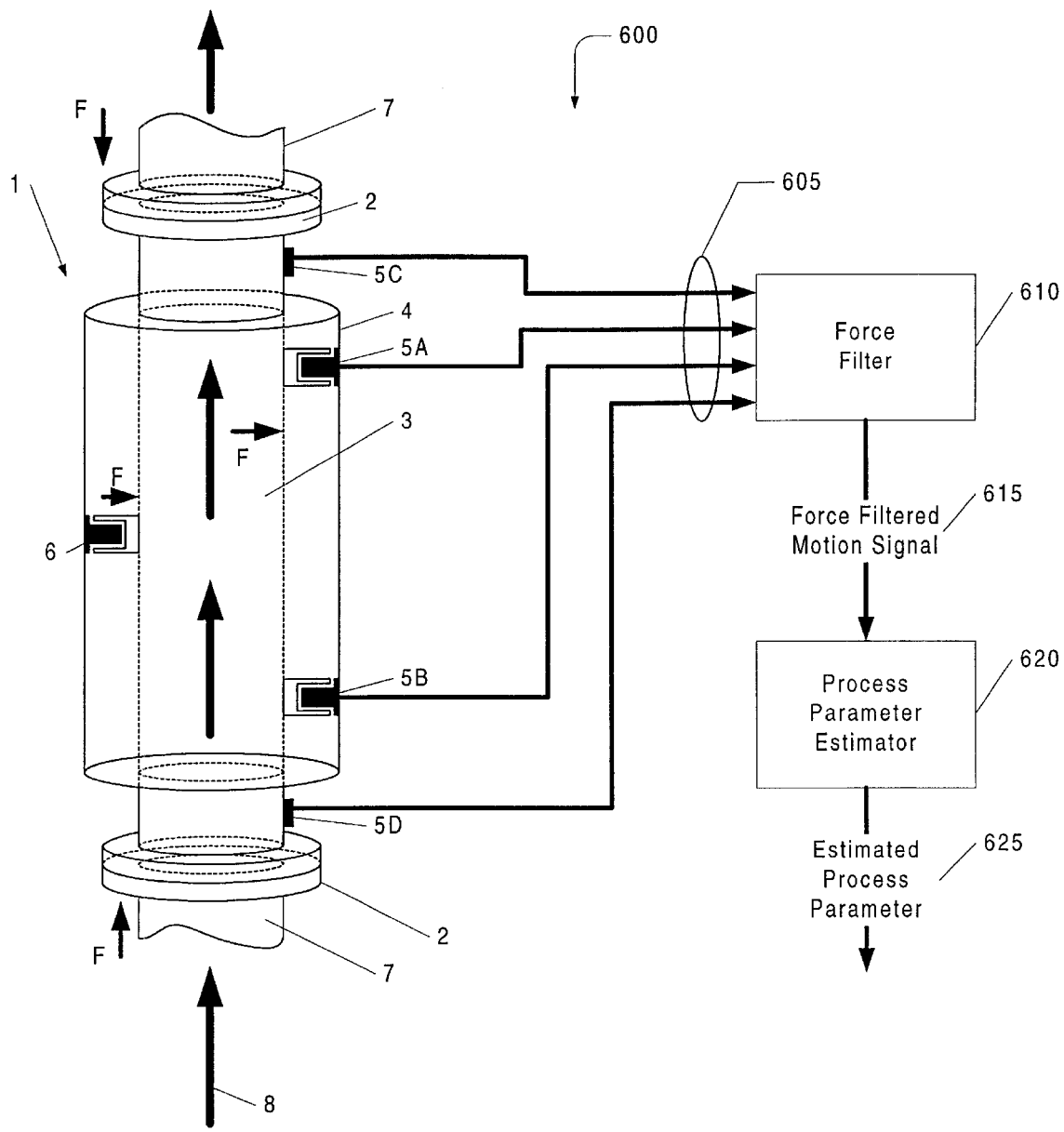
FIG. 6 illustrates a parameter sensor according to an embodiment of the present invention.

FIG. 6 illustrates an exemplary process parameter sensor 600 that implements force filtering according to an embodiment of the present invention. The process parameter sensor 600 includes a "straight-tube" conduit structure 1 including a conduit 3 configured to contain a material 8 from a pipeline 7 connected to the structure 1 at flanges 2. Within a housing 4 surrounding the conduit 3, an actuator 6 is operative to excite the conduit 3. Motion transducers 5A–5D are provided, including velocity transducers 5A, 5B positioned along the conduit 3 on opposite sides of the actuator 6, and strain gauges 5C, 5D positioned near the flanges 2. The motion transducers 5A–5D produce motion signals 605 representing motion of the conduit 3 in response to a plurality of forces F that may include, for example, a drive force imparted by the actuator 6, pressure forces exerted by the material 8, and other extraneous forces such as forces imparted by the pipeline 7, and forces generated by pumps, compressors and other equipment (not shown) connected to the pipeline 7 and conveyed to the conduit 3 via the flanges 2.

The process parameter sensor 600 also includes a force filter 610 that is configured to receive the motion signals 605 and operative to filter motion attributable to extraneous forces to produce a filtered motion signal 615. The force filter 610, preferably derived from a modal characterization of the structure 1 as described above, characterizes motion as motion in a plurality of vibrational modes and discriminates motion attributable to a force of interest of the plurality of forces F acting on the structure 1. A process parameter estimator 620 is responsive to the force filtered motion signal 615 and operative to estimate a process parameter, such as mass flow, from the force filtered motion signal 615.

As described above, the force filter 610 may be used to attenuate components of the motion signals 605 that are associated with extraneous forces, e.g., components which might, for example, corrupt or otherwise render a parameter estimate generated by the sensor 600 inaccurate. For example, the force filter 610 may be used to attenuate components of the motion signals 605 that are associated with shear forces acting at the flanges 2 of the structure 1.

For the sensors 5A–D illustrated, these shear forces may be best observed, for example, by the strain gauges 5C, 5D positioned near the flanges 2. Thus, it will be appreciated that discrimination of forces acting on a structure from motion transducer signals is generally dependent upon transducer characteristics such as placement, bandwidth and the like.

It will be understood that other configurations may be used for the sensor 600. Multiple actuators may be employed, as well as additional motion transducers or motion transducers positioned at different locations on the structure 1. For example, a motion transducer may be positioned at an actuator location. In addition, a set of motion transducers may be employed that provides an overdetermined source of information for determining structural motion, i.e., a number of transducers greater than the number of forces acting on the structure 1. Least squares techniques may be applied to such an overdetermined set in a manner similar to that described in U.S. patent application Ser. No. 09/116,845, filed Jul. 16, 1998, assigned to the assignee of the present invention and incorporated herein by reference in its entirety.

Figure 7:
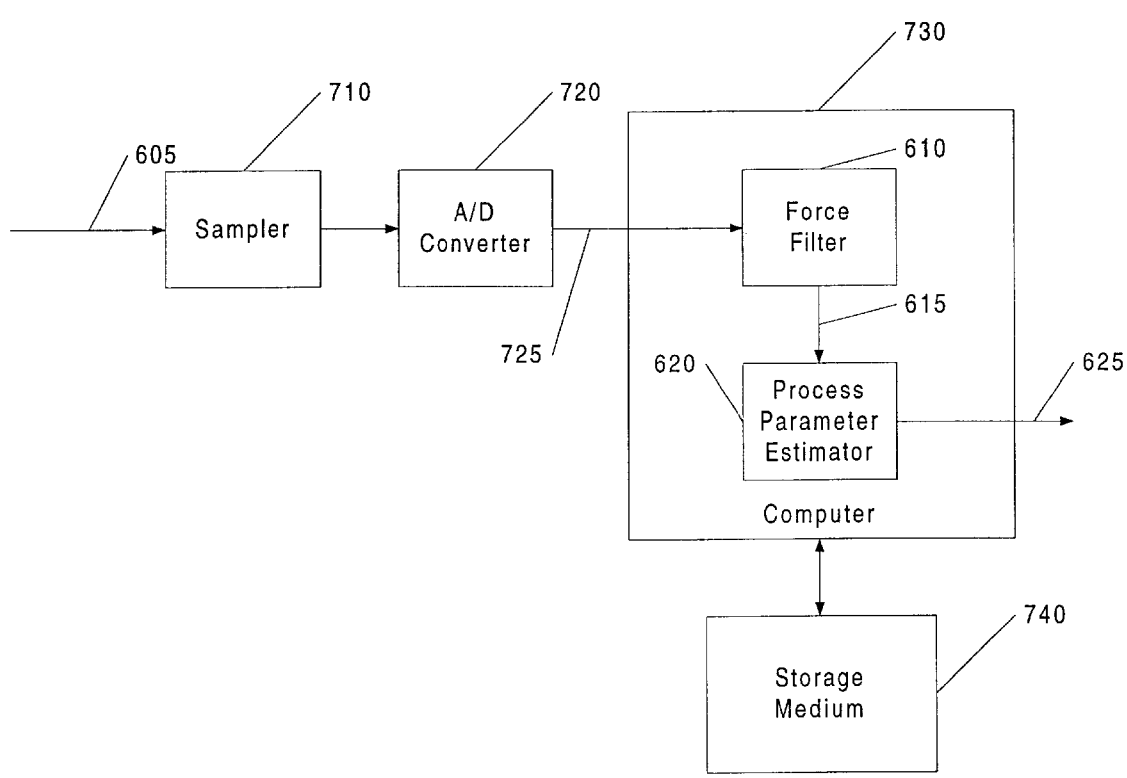
FIGS. 7–8 are schematic diagrams illustrating components for implementing force filters and process parameter estimators according to embodiments of the present invention.

FIG. 7 illustrates a digital implementation of a force filter 610 according to an embodiment of the present invention. Motion signals 605 are sampled by a sampler 710 to produce analog voltage samples that are converted to digital motion signal values 725 by an analog-to-digital (A/D) converter 720. Implemented, for example, as program code stored in a storage medium 740 and executing on a computer 730, the force filter 610 processes the digital motion signal values 725 to produce filtered motion signal values 615. The filtered motion signal values 615 may then be further processed by a process parameter estimator 620, here shown as implemented by program code stored in the storage medium 740 and executing on the computer 730, to produce an estimated process parameter 625.

Figure 8:
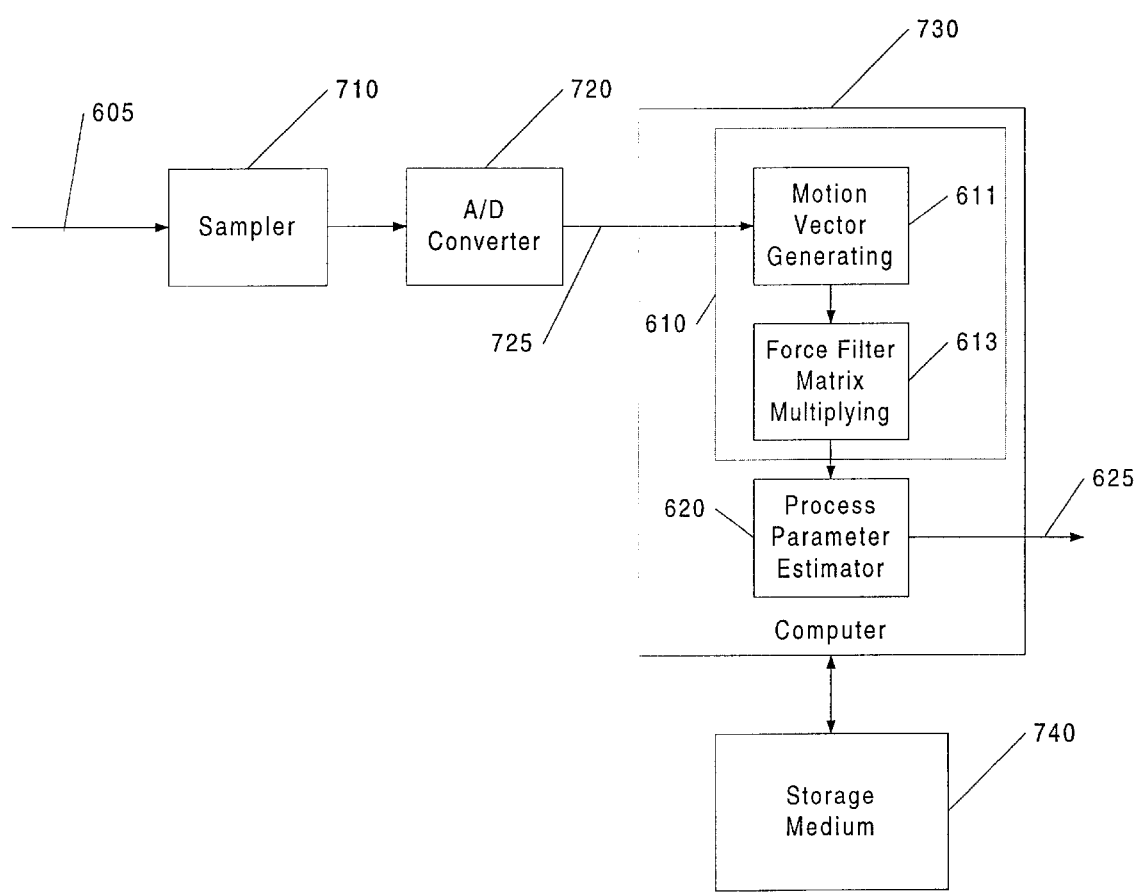

As illustrated in FIG. 8, the force filter 610 may comprise means 611 for generating a motion vector, for example, the velocity response vector $\{\dot{x}\}$ described above, from the motion signal values 725. The force filter 610 may also include means 613 for multiplying the motion vector by a force filter matrix, e.g., the force filter matrix $[FF(\omega)]$ described above, to produce a filtered motion vector, e.g., the force filtered velocity response $\{\dot{x}_{FF}\}$.

Those skilled in the art will appreciate that the computer 730 of FIGS. 7 and 8 may include a variety of different computing devices, such as microprocessors, digital signal processors (DSPs) and application specific integrated circuits (ASICs) with specialized computational capabilities. For example, as the force filter 610 preferably is implemented using matrix computations, the computer 730 may be implemented using a DSP such as a chip of the TM320C40 line (produced by Texas Instruments Inc.) for optimally performing such matrix computations, under control of a general purpose processor such as an Alpha microprocessor (produced by Compaq Computer Corp.). However, those skilled in the art will appreciate that the present invention may be amenable to implementation using a variety of computing devices, dependent on the computational burdens associated with the number of motion signals processed, timeline requirements, and the like.

Figure 9:
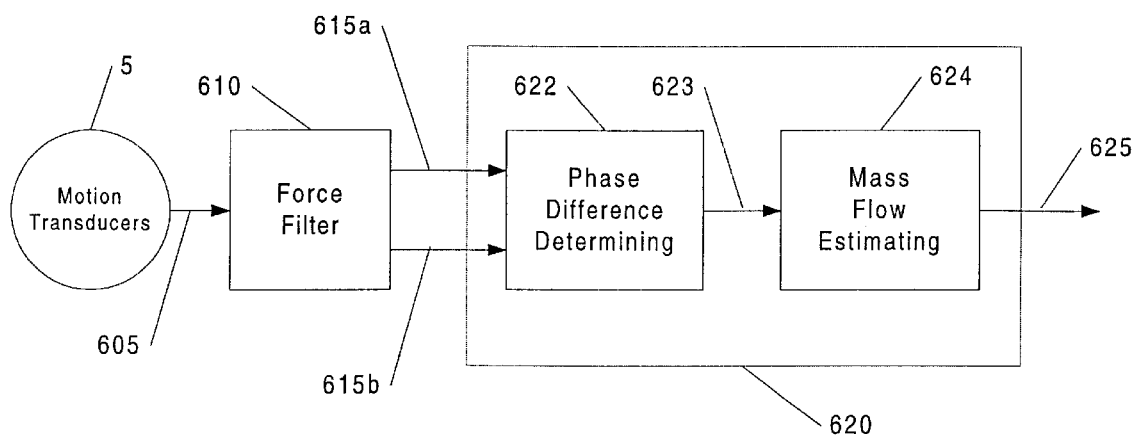
FIG. 9 illustrates an exemplary process parameter estimator according to an embodiment of the present invention.

FIG. 9 illustrates an exemplary mass flow implementation of the process parameter estimator 620 of FIG. 6. Motion signals 605 produced by motion transducers 5 are filtered by a force filter 610 that produces first and second force filtered values 615a, 615b. The first and second force filtered values 615a, 615b may correspond, for example, to first and second components $\dot{x}_{FF1}$, $\dot{x}_{FF2}$ of a force-filtered motion vector $\{\dot{x}_{FF}\}$ representing motion at respective first and second locations on the conduit structure 1 of FIG. 6 (components corresponding to the velocity transducers 5A, 5B). The process parameter estimator 620 includes means 622 for determining a phase difference 623 between the first and second force filtered values 615a, 615b. Means 624 are provided for generating an estimate 625 of mass flow from the determined phase difference 623.

Figure 10:
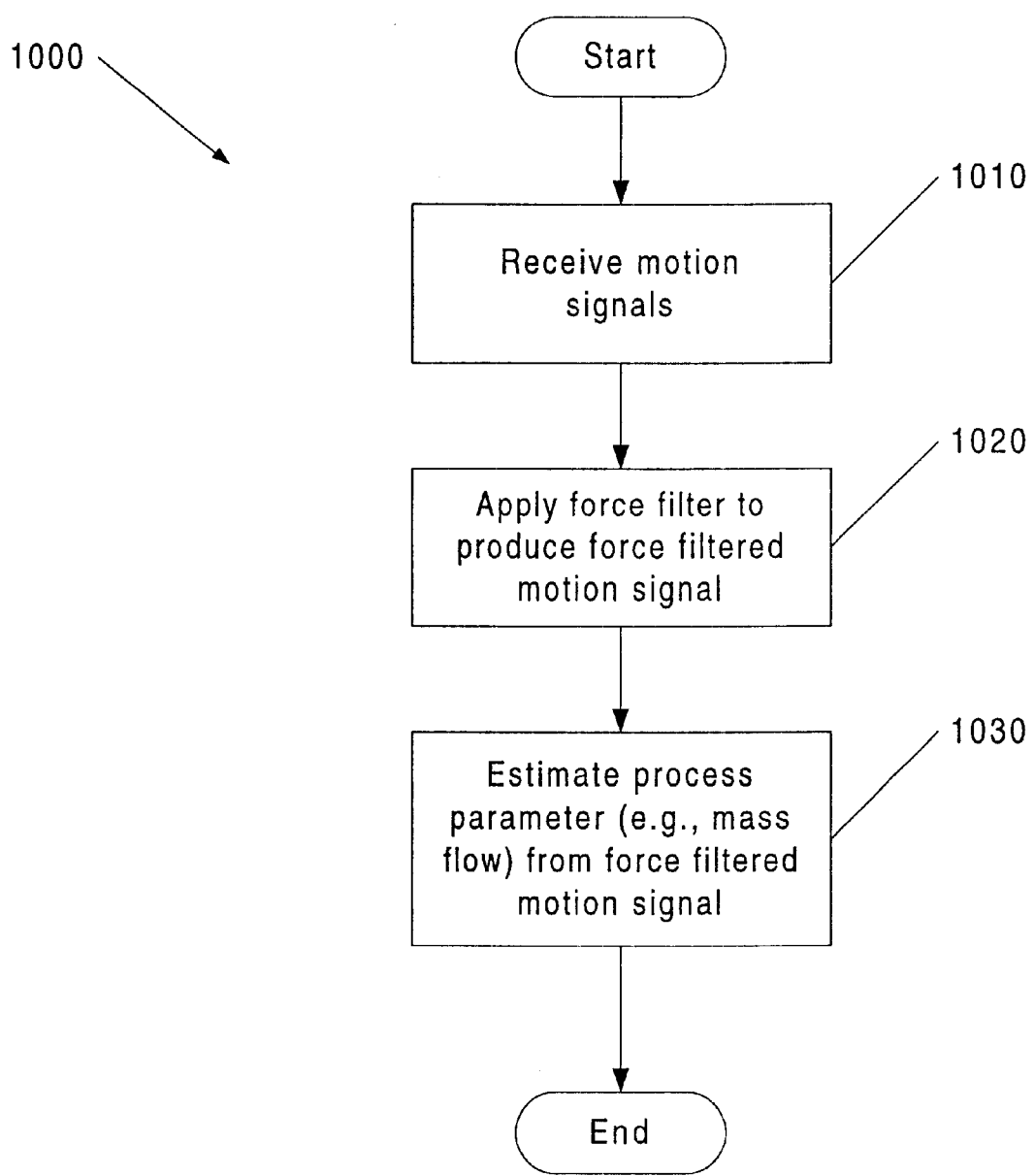
FIGS. 10–11 illustrate exemplary operations for estimating a process parameter according to aspects of the present invention.
Figure 11:
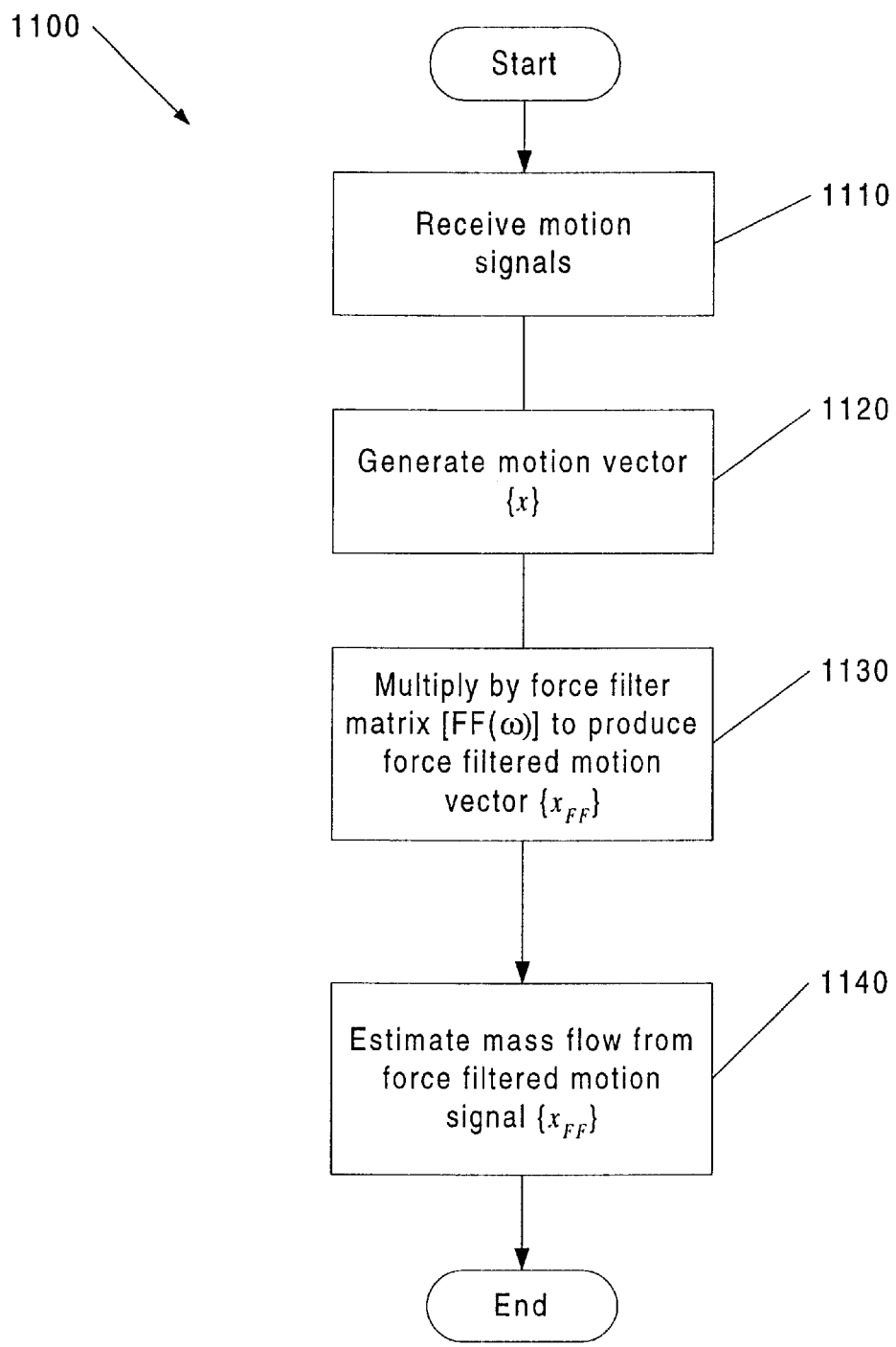

FIGS. 10 and 11 are flowchart illustrations of exemplary operations for estimating process parameters according to aspects of the present invention. Those skilled in the art will understand that the operations of these flowchart illustrations may be can be implemented using computer instructions. These instructions may be executed on a computer or other data processing apparatus (such as the computer 730 of FIGS. 7 and 8) to create an apparatus (system) operative to perform the illustrated operations. The computer instructions may also be stored as computer readable program code on a computer readable medium such as the storage medium 740 of FIGS. 7 and 8, for example, an integrated circuit memory, a magnetic disk, a tape or the like, that can direct a computer or other data processing apparatus to perform the illustrated operations, thus providing means for performing the illustrated operations. The computer readable program code may also be executed on a computer or other data-processing apparatus to cause the apparatus to perform a computer-implemented process. Accordingly, FIGS. 10 and 11 support apparatus (systems), computer program products and methods for performing the operations illustrated therein.

Exemplary operations 1000 for estimating a process parameter according to an aspect of the present invention are illustrated in FIG. 10. Motion signals representing motion of a conduit structure such as the conduit structure 1 of FIG. 6 in response to a plurality of applied forces are received (Block 1010). A force filter is applied to the received motion signals 1020 to produce a filtered motion signal that discriminates motion attributable to a force of interest (Block 1020). A process parameter , e.g., mass flow, density or the like, is estimated from the force filtered motion signal (Block 1030).

According to an aspect of the present invention illustrated in FIG. 11, operations 1100 for estimating mass flow include receiving motion signals representing motion of a conduit structure such as the structure 1 of FIG. 6 as a material flows through the structure (Block 1110). A motion vector, for example, a velocity vector constructed from a plurality of motion signal values such as the digital motion signal values 725 of FIG. 7, is generated from the received motion signals (Block 1120). The motion vector is multiplied by a force filter matrix to produce a force filtered motion vector. Mass flow is estimated from the filtered motion signal vector (Block 1130).

Figure 12:
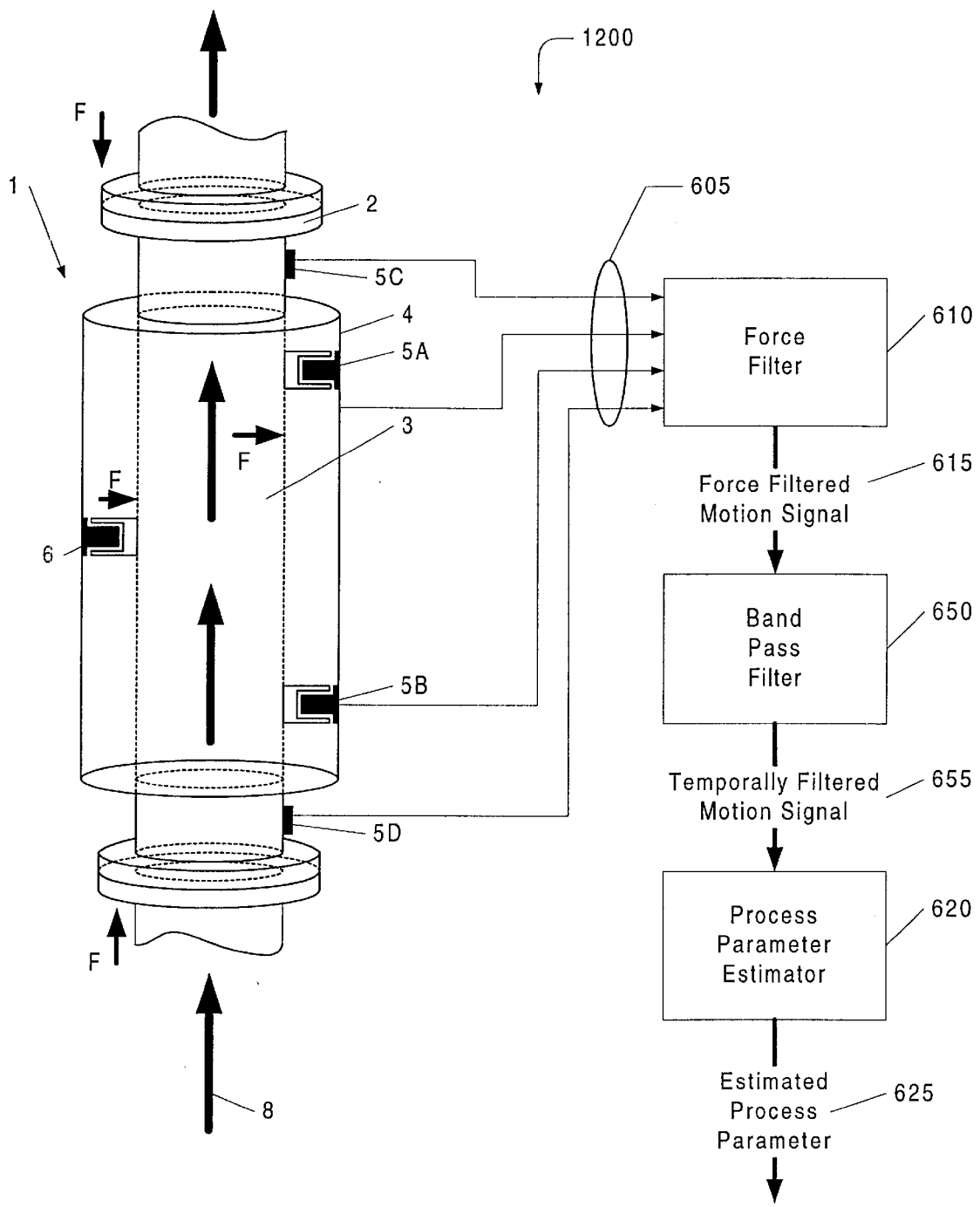
FIG. 12 illustrates a parameter sensor according to another embodiment of the present invention.

FIG. 12 illustrates an exemplary parameter sensor 1200 according to another embodiment of the present invention. The parameter sensor 1200 includes a conduit structure 1 including components as described above in relation to FIG. 6. The process parameter sensor 1200 also includes a force filter 610 that is configured to receive the motion signals 605 and operative to produce a force filtered motion signal 615, as described above in relation to FIG. 6.

The force filtered motion signal 615 is further processed by a band pass filter 650, i.e., a temporal (frequency domain) filter that preferentially passes frequency components of the force filtered motion signal 615 in a selected range of frequencies. For example, the selected range of frequencies may be a narrow band defined about a resonant frequency of a drive mode of the conduit structure 1 excited by the actuator 6. The bandpass filter 650 produces a temporally filtered motion signal 655 from which a process parameter estimator 620 generates an estimate 625 of a process parameter, such as mass flow, density or the like.

Figure 13:
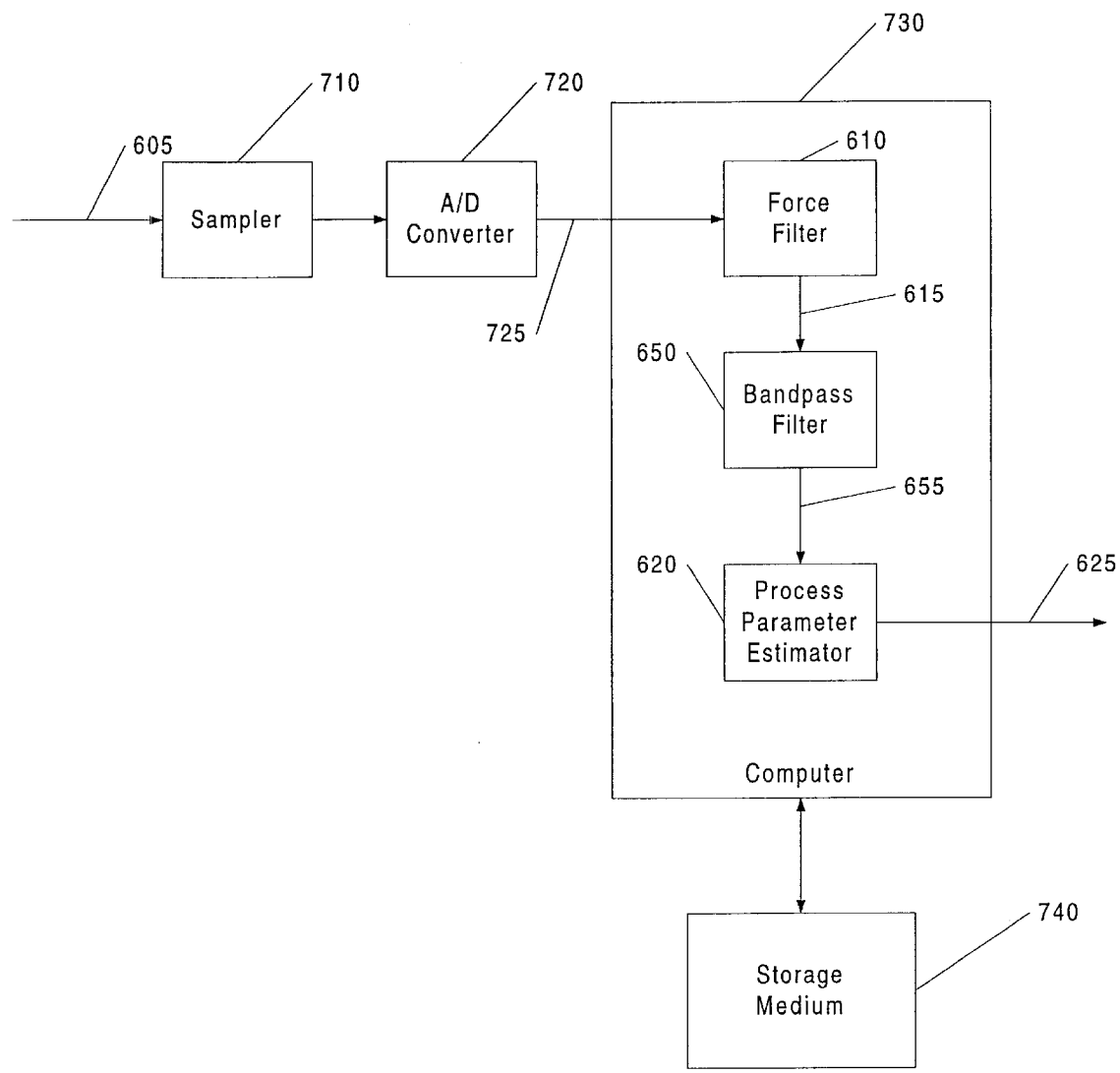
FIG. 13 is a schematic diagram illustrating components for implementing a force filter, band pass filter and process parameter estimator according to an embodiment of the present invention.

FIG. 13 illustrates an exemplary digital implementation of the force filter 620 and the bandpass filter 650 of FIG. 12. Motion signals 605 are sampled by sampler 710, producing analog motion signal values that are converted to digital motion signal values 725 by an A/D converter 720. The force filter 620, implemented by program code stored in a storage medium 740 and executing on a computer 730, processes the digital motion signal values 725 to produce force filtered motion signal values 615. The bandpass filter 650, also implemented by program code stored in the storage medium 740 and executed on the computer 730, temporally filters the force filtered motion signal values 615, producing temporally filtered motion signal values 655. The temporally filtered motion signal values 655 are then used by a process parameter estimator 620, also implemented by program code stored in a storage medium 740 and executing on the computer 730, to generate an estimate 625 of a process parameter.

Those skilled in the art will appreciate that the computer 730 of FIG. 13 may include a variety of different computing devices, such as microprocessors, digital signal processors (DSPs) and application specific integrated circuits (ASICs) with specialized computational capabilities. For example, as the force filter 610 preferably is implemented using matrix computations, the computer 730 may be implemented using a DSP such as a chip of the TM320C40 line (produced by Texas Instruments Inc.) for optimally performing such matrix computations, under control of a general purpose processor such as an Alpha microprocessor (produced by Compaq Computer Corp.). However, those skilled in the art will appreciate that the present invention may be amenable to implementation using a variety of computing devices, dependent on the computational burdens associated with the number of motion signals processed, timeline requirements, and the like.

Figure 14:
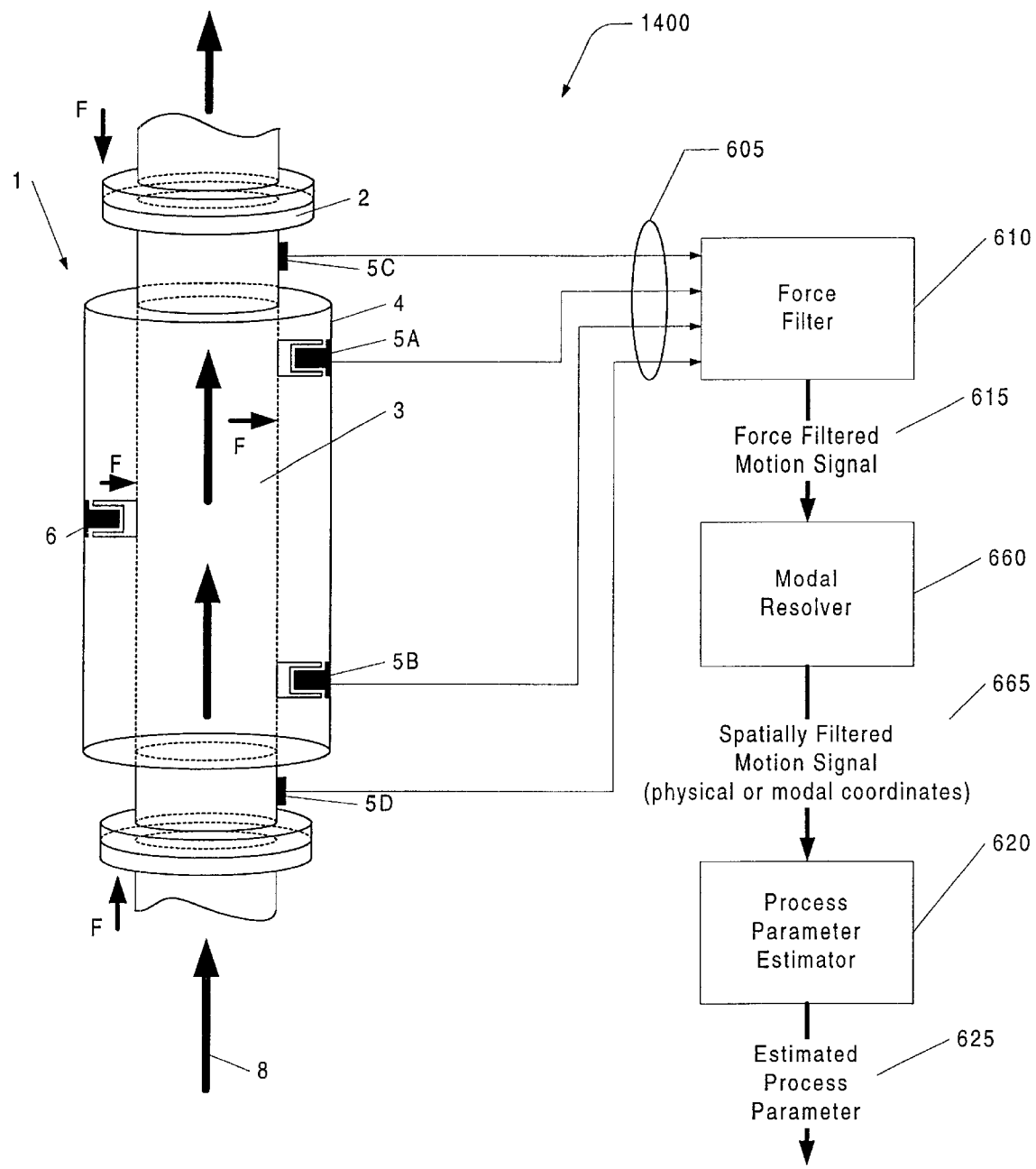
FIGS. 14–16 illustrate parameter sensors according to yet other embodiments of the present invention.

FIG. 14 illustrates an exemplary process parameter sensor 1400 according to another embodiment of the present invention. The parameter sensor 1400 includes a conduit structure 1 as describe above in relation to FIGS. 6 and 12. The process parameter sensor 1400 includes a force filter 610 that is configured to receive the motion signals 605 and operative to produce a force filtered motion signal 615, as described above in relation to FIGS. 6 and 12.

The force filtered motion signal 615 is further processed by a modal resolver 660 that is operative to resolve motion represented by the force filtered motion signal 615 into a plurality of modal components, i.e., components associated with a plurality of vibrational modes of the conduit structure 1. The modal resolver 660 produces a spatially filtered motion signal 665 (i.e., a signal which may represent motion in either a physical or modal coordinate frame, as is discussed in greater detail below), from which a process parameter estimator 620 generates an estimate 625 of a process parameter, such as mass flow. Operations of a modal resolver such as the modal resolver 660 of FIG. 14 are described in the aforementioned U.S. patent application Ser. No. 09/116,410, filed Jul. 16, 1998.

Figure 15:
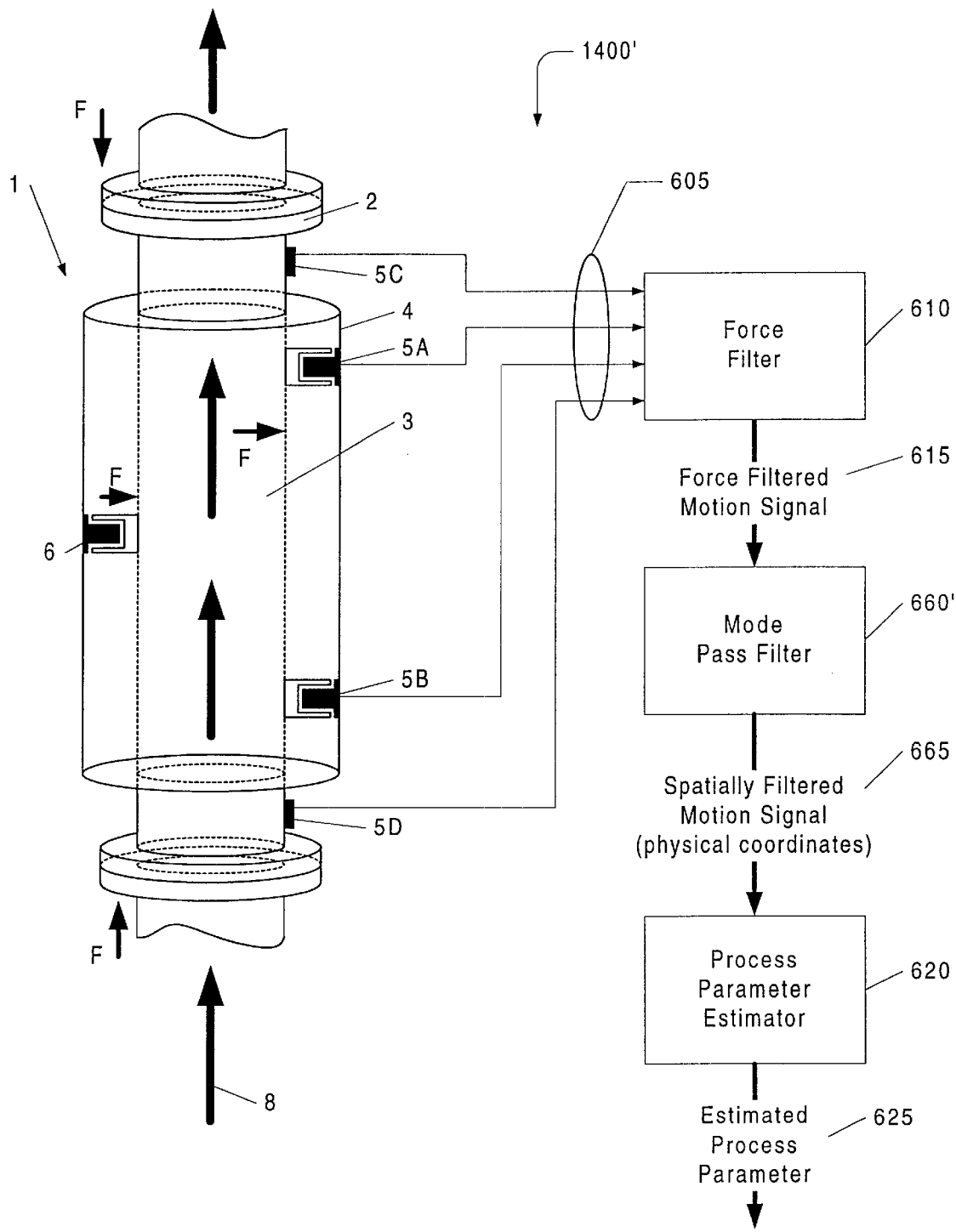

As illustrated in FIG. 15, a parameter sensor 1400 may comprise a modal resolver implementing a "mode pass" filter 660' that produces a spatially filtered response 665 in a physical coordinate domain, e.g., a filter that applies a mode pass filter matrix $[\Psi]$ to produce a spatially filtered physical response $\{\dot{x}_{MPF}\}$ from the force filtered response $\{\dot{x}_{FF}\}$ that preferentially includes components of the force filtered response $\{\dot{x}_{FF}\}$ associated with one or more particular modes of interest:

$$\{\dot{x}_{MPF}\} = [\Psi]\{\dot{x}_{FF}\},$$

where $$[\Psi] = [\Phi][A][\Phi]^{-1},$$

and where $[\Phi]$ represents a modal transformation matrix as described above and $[A]$ represents a diagonal modal selectivity matrix having "0s" at locations along its diagonal corresponding to undesired modes, and "1s" at diagonal locations corresponding to modes of interest. The spatially filtered response $\{\dot{x}_{MPF}\}$ may be used to generate estimates of process parameters such as mass flow, as described in the aforementioned U.S. patent application Ser. No. 09/116,410, filed Jul. 16, 1998.

Figure 16:
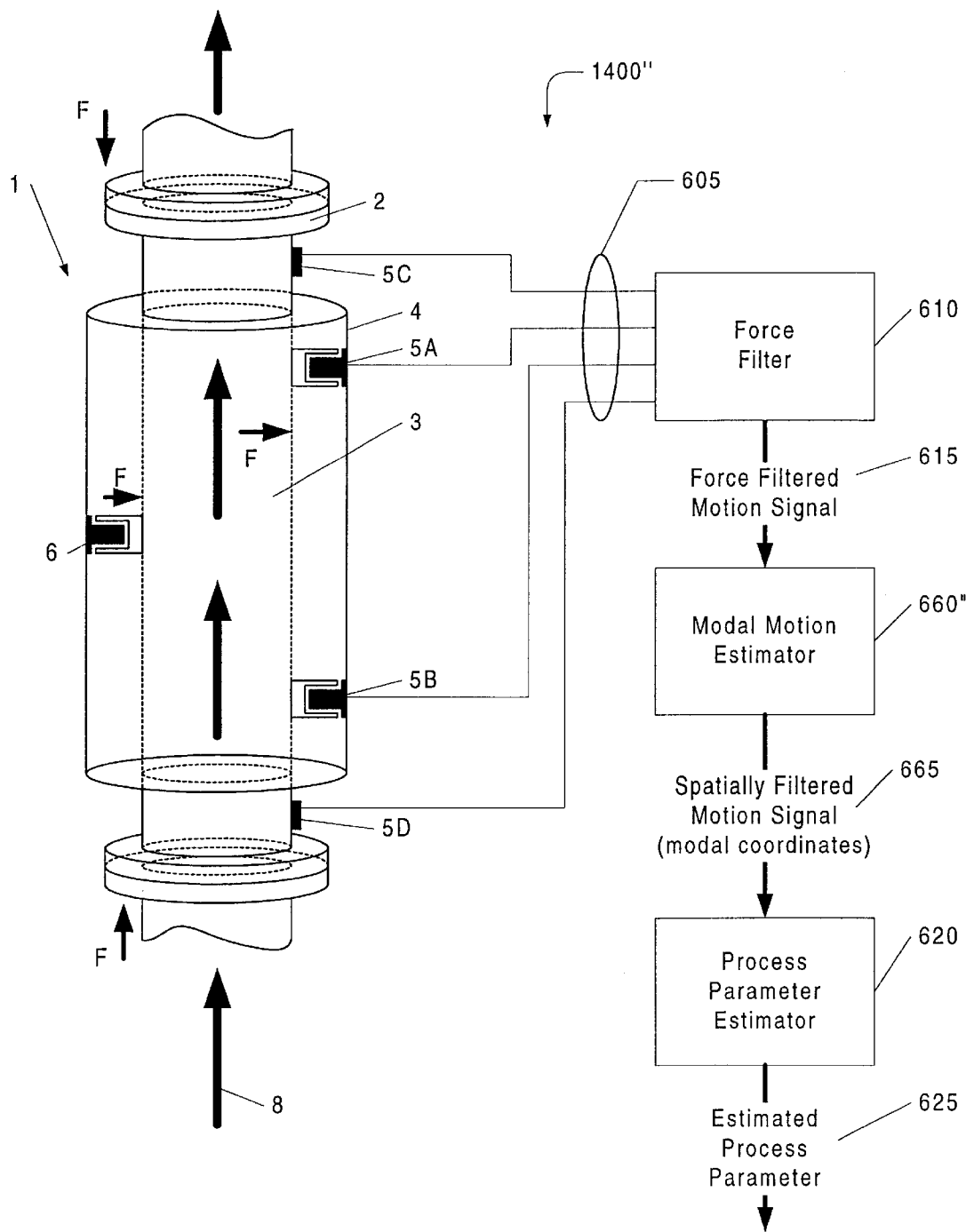

As illustrated in FIG. 16, in another embodiment of the present invention, a parameter sensor 1400 may comprise a modal resolver implementing a modal motion estimator 660" that produces a spatially filtered signal 665 in a modal coordinate domain, e.g., an estimator that applies a modal transformation matrix $[\Phi]$ to produce an estimated modal response $\{\eta_{FF}\}$. Selected components of the modal response $\{\eta_{FF}\}$ may be used by the process parameter estimator 620 to estimate a process parameter, as described in the aforementioned U.S. patent application Ser. No. 09/116,410, filed Jul. 16, 1998.

Figure 17:
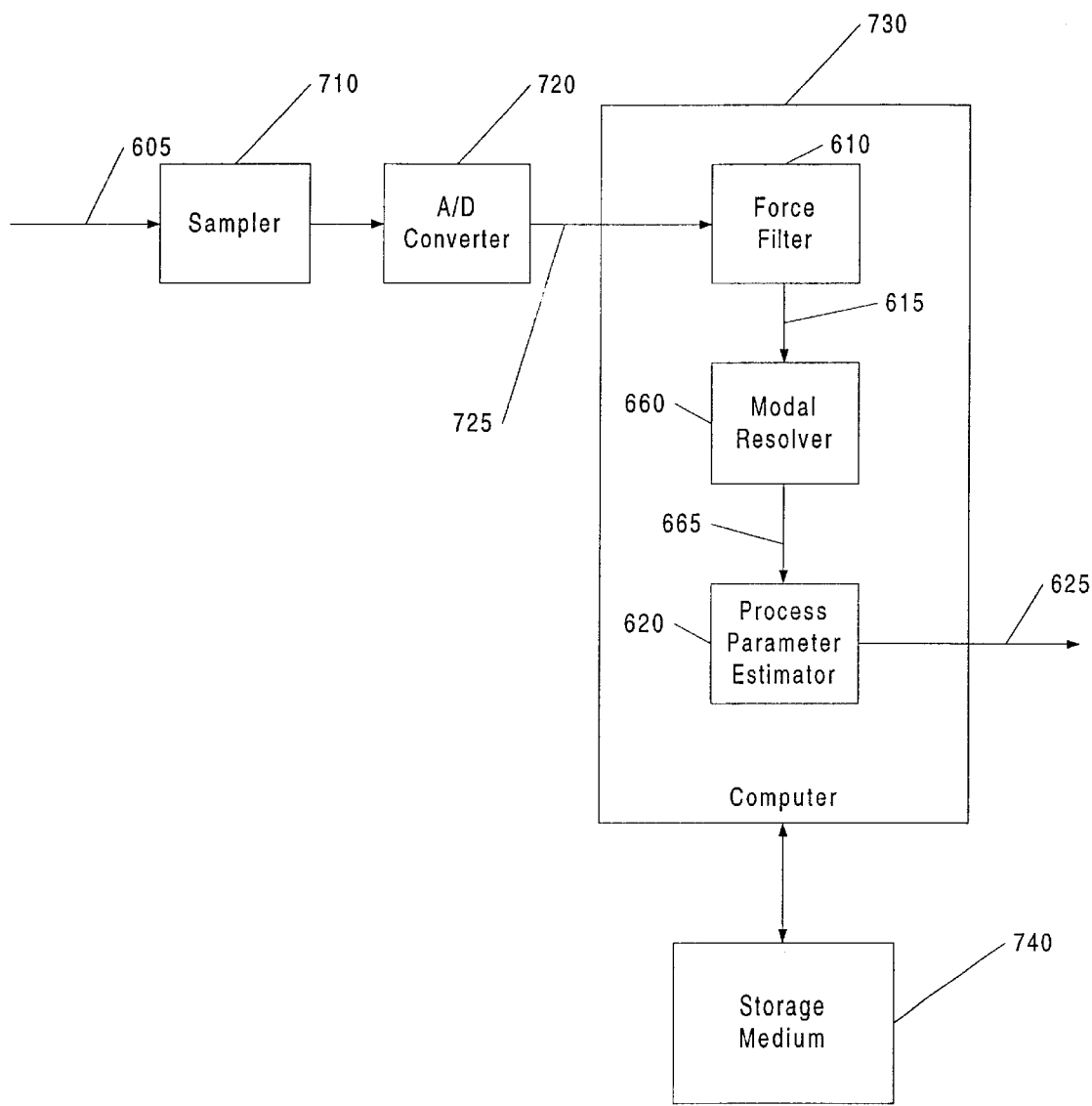
FIG. 17 is a schematic diagram illustrating components for implementing a force filter, modal resolver and process parameter estimator according to an embodiment of the present invention.

FIG. 17 illustrates an exemplary digital implementation of the force filter 620 and the modal resolver 660 of FIG. 14. Motion signals 605 are sampled by sampler 710, producing analog motion signal values that are converted to digital motion signal values 725 by an A/D converter 720. The force filter 610, implemented by program code stored in a storage medium 740 and executing on a computer 730, processes the digital motion signal values 725 to produce force filtered motion signal values 615. The modal resolver 660, also implemented by program code stored in the storage medium 740 and executed on the computer 730, processes the force filtered motion signal values 615, producing spatially filtered motion signal values 665 (e.g., in either modal or physical coordinates, as described above). The spatially filtered motion signal values 665 are then used by a process parameter estimator 620, also implemented by program code stored in a storage medium 740 and executing on the computer 730, to generate an estimate 625 of a process parameter.

Those skilled in the art will appreciate that the computer 730 of FIG. 17 may include a variety of different computing devices, such as microprocessors, digital signal processors (DSPs) and application specific integrated circuits (ASICs) with specialized computational capabilities. For example, as the force filter 610 preferably is implemented using matrix computations, the computer 730 may be implemented using a DSP such as a chip of the TM320C40 line (produced by Texas Instruments Inc.) for optimally performing such matrix computations, under control of a general purpose processor such as an Alpha microprocessor (produced by Compaq Computer Corp.). However, those skilled in the art will appreciate that the present invention may be amenable to implementation using a variety of computing devices, dependent on the computational burdens associated with the number of motion signals processed, timeline requirements, and the like.

Figure 18:
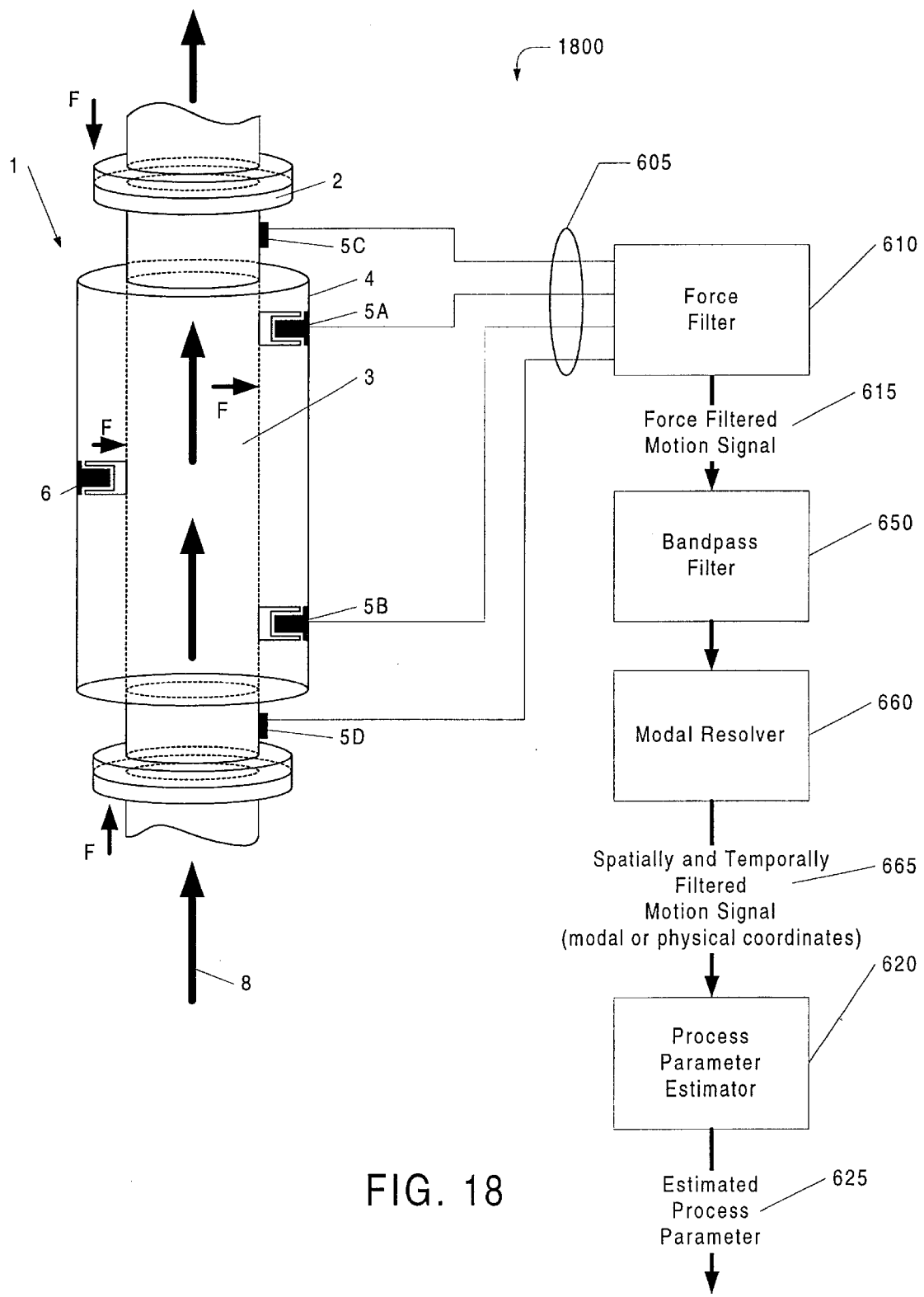
FIG. 18 illustrates a parameter sensor according to another embodiment of the present invention.

As illustrated in FIG. 18, a parameter sensor 1800 may implement both temporal and spatial filtering in conjunction with force filtering. The process parameter sensor 1800 includes a force filter 610 that produces a force filtered motion signal 615 that is further processed by a bandpass filter 650 and a modal resolver 660 to produce a spatially and temporally filtered motion signal 665, which may represent motion in either a physical or modal coordinate frame, as described above. A process parameter estimator 620 generates an estimate 625 of a process parameter such as mass flow from the spatially and temporally filtered motion signal 665.

Figure 19:
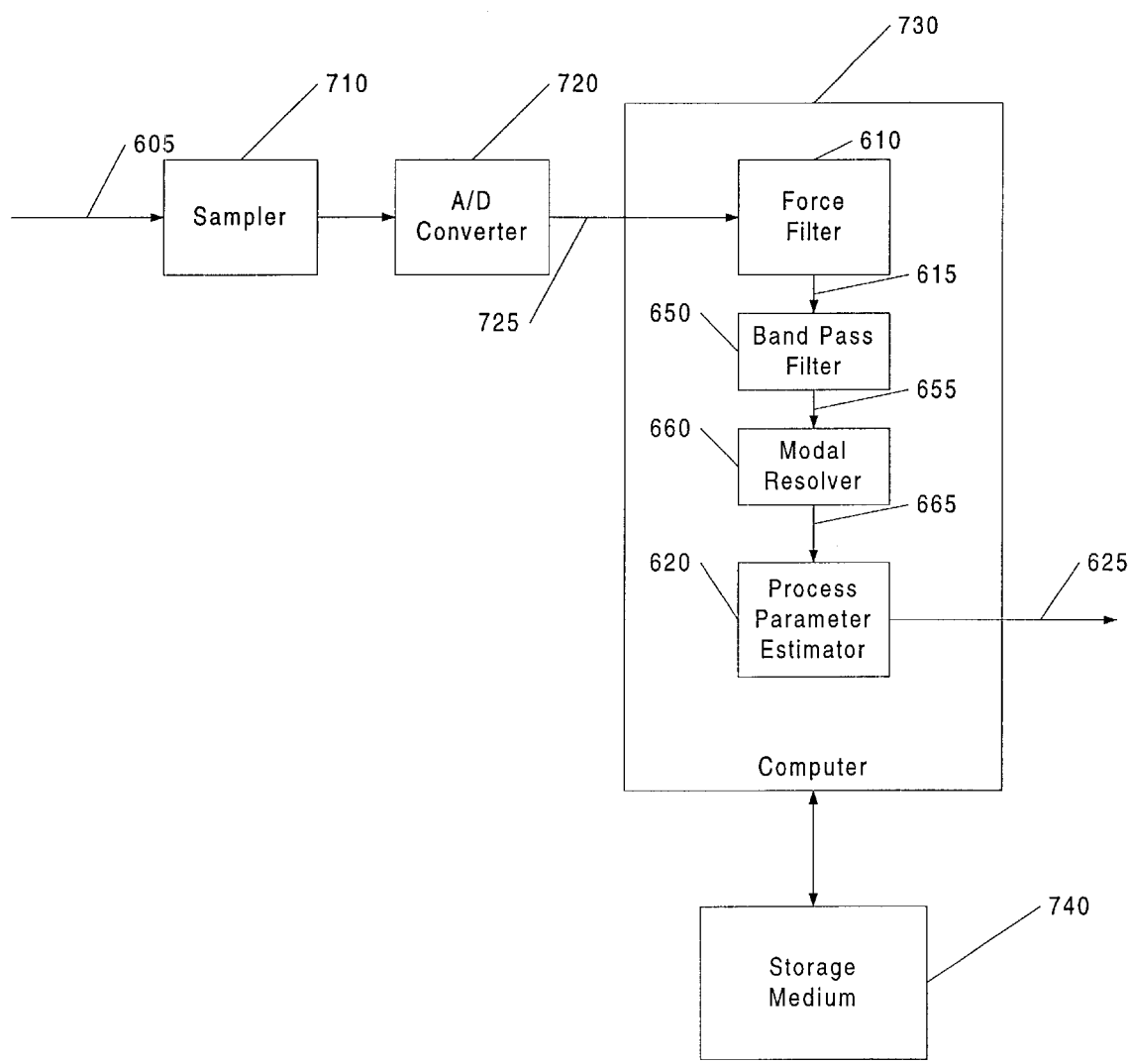
FIG. 19 is a schematic diagram illustrating components for implementing a force filter, modal resolver and process parameter estimator according to an embodiment of the present invention.

As illustrated in FIG. 19, the force filter 610, bandpass filter 650, and modal resolver 660 of FIG. 18 may be digitally implemented. Motion signals 605 are sampled by sampler 710, producing analog motion signal values that are converted to digital motion signal values 725 by an A/D converter 720. The force filter 610, implemented by program code stored in a storage medium 740 and executing on a computer 730, processes the digital motion signal values 725 to produce force filtered motion signal values 615. The bandpass filter 650, also implemented by program code stored in the storage medium 740 and executed on the computer 730, temporally filters the force filtered motion signal values 615, producing temporally filtered motion signal values 655. The temporally filtered motion signal values 655 are then spatially filtered using the modal resolver 660 to produce spatially and temporally filtered motion values 665 that may be used by a process parameter estimator 620, also implemented by program code stored in a storage medium 740 and executing on the computer 730, to generate an estimate 625 of a process parameter.

Those skilled in the art will appreciate that the computer 730 of FIG. 19 may include a variety of different computing devices, such as microprocessors, digital signal processors (DSPs) and application specific integrated circuits (ASICs) with specialized computational capabilities. For example, as the force filter 610 preferably is implemented using matrix computations, the computer 730 may be implemented using a DSP such as a chip of the TM320C40 line (produced by Texas Instruments Inc.) for optimally performing such matrix computations, under control of a general purpose processor such as an Alpha microprocessor (produced by Compaq Computer Corp.). However, those skilled in the art will appreciate that the present invention may be amenable to implementation using a variety of computing devices, dependent on the computational burdens associated with the number of motion signals processed, timeline requirements, and the like.

Those skilled in the art will appreciate that the force filtering, bandpass filtering and modal filtering described herein may be implemented a number of other ways than the embodiments described herein. For example, matrix computations for force filtering, bandpass filtering and modal filtering described herein may be implemented as separate computations, or may be combined into one or more computations that achieve equivalent results. The force filtering, temporal (bandpass)filtering and spatial (modal) filtering described herein may also be implemented in parametric forms that produce equivalent results to the computational techniques described herein. The order of the force filtering, bandpass (temporal) filtering and modal (spatial) filtering functions may also be changed from that described for the embodiments depicted herein.

Portions of these filtering functions may also be implemented using analog signal processing techniques. For example, the bandpass filtering described in reference to FIG. 12 may be implemented in analog electronic circuits instead of a digital computer. The analog filtered signals produced by such analog filtering may be directly used, for example, in the conventional phase measurement circuits, e.g., zero-crossing type detector circuits, that are commonly used in conventional Coriolis mass flowmeters.

Those skilled in the art will also appreciate that although the present invention may be embodied as an apparatus, for example, as part of a Coriolis mass flowmeter, or as methods which may be performed by such apparatus, the present invention may also be embodied in an article of manufacture in the form of computer-readable instructions or program code means embodied in a computer readable storage medium such as a magnetic disk, integrated circuit memory device, magnetic tape, bubble memory or the like. For example, according to an aspect of the present invention, a force filter and associated parameter estimator may be embodied in computer-readable program code means that may be loaded onto a computer or other data processor and executed responsive to motion signals supplied from motion transducers operatively associated with a structure such as a Coriolis mass flowmeter conduit.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of estimating a process parameter associated with a material contained in a vibrating structure, the method comprising the steps of:

receiving a plurality of motion signals representing motion at a plurality of locations of the vibrating structure;

force filtering the received plurality of motion signals with a force filter to produce a force-filtered motion signal that discriminates motion attributable to a force of interest among a plurality of forces acting on the vibrating structure; and estimating a process parameter associated with the material in the vibrating structure from the force filtered motion signal.

2. A method according to claim 1:

wherein said step of force filtering is preceded by the step of generating a plurality of motion signal values from the received plurality of motion signals;

wherein said step of force filtering comprises the step of applying a force filter matrix to the plurality of motion signal values to produce a force filtered motion signal value; and wherein said step of estimating a process parameter comprises the step of estimating a process parameter from the force filtered motion signal value.

3. A method according to claim 2, wherein the force filter matrix represents a product of a frequency response function matrix for the vibrating structure, a force selectivity matrix and an inverse of the frequency response function matrix.

4. A method according to claim 1, wherein the force filter represents a function of frequency evaluated at a frequency of interest, and wherein said step of estimating a process parameter comprises the step of estimating a process parameter from the force filtered motion signal at the frequency of interest.

5. A method according to claim 4, wherein said step of receiving is preceded by the step of exciting the structure at the frequency of interest, and wherein said step of receiving comprises the step of receiving a plurality of motion signals representing motion in response to the excitation.

6. A method according to claim 4:
wherein said step of estimating a process parameter is preceded by the step of applying a band pass filter to the force filtered motion signal to produce a temporally filtered motion signal; and
wherein said step of estimating a process parameter comprises the step of estimating a process parameter from the temporally filtered motion signal at the frequency of interest.

7. A method according to claim 1, comprising the step of applying a combination of the force filter and a modal resolver to the plurality of motion signals to produce a spatially and temporally filtered motion signal that discriminates motion of the structure associated with a vibrational mode of interest, and wherein said step of estimating a process parameter comprises the step of estimating process parameter from the spatially and temporally filtered motion signal.

8. A method according to claim 7, wherein the modal resolver comprises a mode pass filter.

9. A method according to claim 1, comprising the step of applying a combination of the force filter, a band pass filter and a modal resolver to the plurality of motion signals to produce a spatially and temporally filtered motion signal, and wherein said step of estimating a process parameter comprises the step of estimating a process parameter from the spatially and temporally filtered motion signal.

10. A method according to claim 1, wherein said step of estimating a process parameter comprises the step of estimating mass flow from the force filtered motion signal.

11. A method of determining motion attributable to a force of interest among a plurality of forces applied to a structure, the method comprising the step of:
force filtering a motion signal representing motion of the structure with a force filter to produce a force filtered motion signal that discriminates motion attributable to the force of interest.

12. A method according to claim 11:
wherein said step of force filtering is preceded by the step of generating a motion signal value from the motion signal; and
wherein said step of force filtering comprises the step of applying a force filter matrix to the motion signal value to produce a force filtered motion signal value.

13. A method according to claim 12, wherein the force filter matrix represents a product of a frequency response function matrix for the structure, a force selectivity matrix and an inverse of the frequency response function matrix.

14. A method according to claim 11, wherein the force filter represents a function of frequency evaluated at a frequency of interest, and further comprising the step of determining motion attributable to the force of interest from the force filtered motion signal at the frequency of interest.

15. A method according to claim 14:
wherein said step of determining motion is preceded by the step of applying a band pass filter to the force filtered motion signal to produce a temporally filtered motion signal; and
wherein said step of determining motion comprises the step of determining motion attributable to the force of interest from the temporally filtered motion signal at the frequency of interest.

16. A method according to claim 11, comprising the step of applying a combination of the force filter and a modal resolver to the motion signal to produce a spatially filtered motion signal that discriminates motion of the structure associated with a vibrational mode of interest.

17. A method according to claim 11, comprising the step of applying a combination of the force pass filter, a band pass filter and a modal resolver to the motion signal to produce a spatially and temporally filtered motion signal that discriminates motion in a mode of interest that is attributable to the force of interest and associated with a vibrational mode of interest.

18. A process parameter sensor, comprising:
a structure configured to contain a material;
a plurality of motion transducers operatively associated with said structure and operative to produce a plurality of motion signals representing motion of said structure;
a force filter responsive to plurality of motion signals and operative to produce a force-filtered motion signal therefrom that discriminates motion attributable to a force of interest among a plurality of forces acting on the structure; and
a process parameter estimator operative to estimate a process parameter associated with material in said structure responsive to the force filtered motion signal.

19. A sensor according to claim 18, further comprising means, responsive to said plurality of motion signals for generating a plurality of motion signal values therefrom, and:
wherein said force filter comprises means for applying a force filter matrix to the plurality of motion signal values to produce a force filtered motion signal value; and
wherein said process parameter estimator comprises means for estimating a process parameter from the force filtered motion signal value.

20. A sensor according to claim 19, wherein the force filter matrix represents a product of a frequency response function matrix for the structure, a force selectivity matrix and an inverse of the frequency response function matrix.

21. A sensor according to claim 18, wherein said force filter represents a function of frequency evaluated at a frequency of interest, and wherein said process parameter estimator is operative to estimate a process parameter from the force filtered motion signal at the frequency of interest.

22. A sensor according to claim 21, wherein said force filter is operative to produce a plurality of force filtered motion signals having periodic components at the frequency of interest, and wherein said process parameter estimator comprises a phase detector operative to detect a phase difference between respective ones of periodic components of the plurality of force filtered motion signals at the frequency of interest.

23. A sensor according to claim 21, further comprising an actuator that is operative to excite said structure at the frequency of interest.

24. A sensor according to claim 21, further comprising a band pass filter responsive to the force filtered motion signal and operative to produce a temporally filtered motion signal therefrom, and wherein said process parameter estimator is operative to estimate a process parameter from the temporally filtered motion signal.

25. A sensor according to claim 18, comprising a combination of a force filter and a modal resolver that is operative to produce a spatially filtered motion signal that discriminates motion of the structure associated with a vibrational mode, and wherein said process parameter estimator is operative to estimate a process parameter from the spatially filtered motion signal.

26. A sensor according to claim 18, comprising a combination of a force filter, a band pass filter and a modal resolver operative to produce a spatially and temporally filtered motion signal, and wherein said process parameter estimator is operative to estimate a process parameter from the spatially filtered motion signal.

27. A sensor according to claim 26, wherein said process parameter estimator comprises a mass flow estimator.

28. An apparatus for characterizing motion of a structure, the apparatus comprising:
a force filter configured to receive a motion signal representing motion of the structure and operative to produce a force filtered motion signal therefrom that discriminates motion attributable to a force of interest among a plurality of forces acting on the structure.

29. An apparatus according to claim 28, further comprising means for processing a motion signals to produce a motion signal value, and wherein said force filter comprises:
means for applying a force filter matrix to the motion signal value to produce a force filtered motion signal value.

30. An apparatus according to claim 29, wherein the force filter matrix represents a product of a frequency response function matrix for the structure, a force selectivity matrix and an inverse of the frequency response function matrix.

31. An apparatus according to claim 28, wherein said force filter represents a function of frequency evaluated at a frequency of interest and further comprising means for determining motion attributable to the force of interest from the force filtered motion signal at the frequency of interest.

32. An apparatus according to claim 30, further comprising a band pass filter operative to produce a temporally filtered motion signal from the force filtered motion signal, and wherein said means for determining comprises means for determining motion from the temporally filtered motion signal at the frequency of interest.

33. An apparatus according to claim 28, comprising a combination of said force filter and a mode pass filter operative to produce a spatially filtered motion signal from the motion signal, the spatially filtered motion signal discriminating motion of the structure associated with a vibrational mode of interest.

34. An apparatus according to claim 28, comprising a combination of the force pass filter, a band pass filter and a mode pass filter operative to produce a spatially and temporally filtered motion signal from the motion signal that discriminates motion in a mode of interest that is attributable to the force of interest and associated with a vibrational mode of interest.

35. A computer program product for determining motion attributable to a force of interest among a plurality of forces applied to a structure, the computer program product comprising:
a computer-readable storage medium having computer-readable program code means embodied in said medium, said computer-readable program code means comprising:
first computer-readable program code means for force filtering a motion signal representing motion of the structure with a force filter to produce a force filtered motion signal that discriminates motion attributable to the force of interest.

36. A computer program product according to claim 35, wherein said first computer-readable program code means comprises computer-readable program code means for applying a force filter matrix to a motion signal value to produce a force filtered motion signal value.

37. A computer program product according to claim 36, wherein the force filter matrix represents a product of a frequency response function matrix for the structure, a force selectivity matrix and an inverse of the frequency response function matrix.

38. A computer program product according to claim 35, wherein said computer-readable program code means comprises second computer-readable program code means for applying a band pass filter to the filtered motion signal to produce a temporally filtered motion signal that discriminates motion of the structure at a frequency of interest.

39. A computer program product according to claim 35, wherein said computer-readable program code means comprises computer-readable program code means for applying a combination of the force filter and a modal resolver to the motion signal to produce a spatially filtered motion signal that discriminates motion of the structure associated with a vibrational mode of interest.

40. A computer program product according to claim 35, wherein said computer-readable program code means comprises computer-readable program code means for applying a combination of the force pass filter, a band pass filter and a modal resolver to the motion signal to produce a spatially and temporally filtered motion signal that discriminates motion in a mode of interest that is attributable to the force of interest and associated with a vibrational mode of interest.

41. A computer program product according to claim 35, wherein the structure comprises a vibrating structure configured to contain a material, and wherein said computer-readable program code means comprises second computer-readable program code means, responsive to said first computer-readable program code means, for estimating a process parameter associated with the material in the vibrating structure from the force filtered motion signal.

42. A computer program product according to claim 41, wherein said second computer-readable program code means comprises computer-readable program code means for estimating mass flow of the material in the vibrating structure from the force filtered motion signal.

* * * * *

UNITED STATES PATENT AND TRADEMARK OFFICE
CERTIFICATE OF CORRECTION

PATENT NO. : 6,577,977 B2
DATED : June 10, 2003
INVENTOR(S) : David F. Normen

It is certified that error appears in the above-identified patent and that said Letters Patent is hereby corrected as shown below:

Column 1,
Line 25, replace "immaterial-filed system generally are affected by the com-" with
-- material-filled system generally are affected by the com- --
Line 29, replace "A typical Coriolis mass flowmeters includes one or more" with
-- A typical Coriolis mass flowmeter includes one or more --

Column 3,
Line 64, replace "selectivity-matrix and an inverse of the frequency response" with
-- selectivity matrix and an inverse of the frequency response --

Column 6,
Line 64, replace " $\{\dot{x}\} = [[\Phi][Q][\beta(\omega)][\Phi]^T + [\Phi][Q]^*[\beta^*(\omega)][\Phi]^T]\{F\}$, (4)"

with -- $\{\dot{x}\} = [[\Phi][Q][\delta(\omega)][\Phi]^T + [\Phi][Q]^*[\delta^*(\omega)][\Phi]^T]\{F\}$, (4) --

Column 7,
Line 15, replace " $[H(\omega)] = [\Phi][Q][\beta(\omega)][\Phi]^T + [\Phi][\overline{Q}][\overline{\beta}(\omega)][\Phi]$,  (5)"

with -- $[H(\omega)] = [\Phi][Q][\delta(\omega)][\Phi]^T + [\Phi][\overline{Q}][\overline{\delta}(\omega)][\Phi]$,  (5) --

Line 28, replace " $[H(\omega)] = [\Phi][W_r[]\Delta(\omega)][\Phi]^T$,  (6)"

with -- $[H(\omega)] = [\Phi][W_r][\Delta(\omega)][\Phi]^T$,  (6) --

Signed and Sealed this

Thirtieth Day of December, 2003

JAMES E. ROGAN
*Director of the United States Patent and Trademark Office*